US 8,054,502 B2

(12) United States Patent
Koga

(10) Patent No.: US 8,054,502 B2
(45) Date of Patent: Nov. 8, 2011

(54) SCANNING OPTICAL APPARATUS, IMAGE FORMING APPARATUS AND IMAGE CLOCK CORRECTION METHOD

(75) Inventor: Katsuhide Koga, Moriya (JP)

(73) Assignee: Canon Kabushiki Kaisha (JP)

( * ) Notice: Subject to any disclaimer, the term of this patent is extended or adjusted under 35 U.S.C. 154(b) by 994 days.

(21) Appl. No.: 11/957,748

(22) Filed: Dec. 17, 2007

(65) Prior Publication Data

US 2008/0151334 A1 Jun. 26, 2008

(30) Foreign Application Priority Data

Dec. 21, 2006 (JP) ................................. 2006-344670

(51) Int. Cl.
*H04N 1/60* (2006.01)
(52) U.S. Cl. ......... 358/1.9; 358/505; 358/518; 358/475; 399/151; 399/221; 347/129; 347/249
(58) Field of Classification Search .................. 358/505, 358/1.9, 1.12, 474, 409, 1.1, 3.01, 481, 475, 358/509; 399/151, 51, 162, 301, 221; 359/205.1, 359/224; 347/129, 249, 232, 234, 235, 239
See application file for complete search history.

(56) References Cited

U.S. PATENT DOCUMENTS

| | | | | |
|---|---|---|---|---|
| 5,610,651 A * | 3/1997 | Yamakawa et al. | ............ | 347/250 |
| 5,909,244 A * | 6/1999 | Waxman et al. | ........... | 348/222.1 |
| 6,028,958 A * | 2/2000 | Kanamori | ..................... | 382/171 |
| 6,693,725 B1 * | 2/2004 | Kanno | ........................... | 358/1.9 |
| 6,937,264 B2 * | 8/2005 | Kanno | ........................... | 347/250 |
| 7,079,172 B2 * | 7/2006 | Izumiya et al. | ............... | 347/249 |
| 7,139,013 B2 * | 11/2006 | Kanno | ........................ | 347/250 |
| 7,692,679 B2 * | 4/2010 | Shiraishi | ....................... | 347/249 |
| 7,782,511 B2 * | 8/2010 | Otoguro | ..................... | 359/196.1 |
| 2003/0112317 A1 * | 6/2003 | Murakami | ..................... | 347/116 |
| 2003/0156184 A1 * | 8/2003 | Suzuki et al. | ................. | 347/249 |
| 2004/0032482 A1 * | 2/2004 | Ozasa et al. | ................... | 347/237 |
| 2004/0036757 A1 * | 2/2004 | Yoshida | ........................ | 347/132 |
| 2005/0200930 A1 * | 9/2005 | Kanno | ........................ | 359/212 |
| 2007/0216756 A1 * | 9/2007 | Komiya et al. | ............... | 347/246 |
| 2007/0285490 A1 * | 12/2007 | Tamaoki | ....................... | 347/232 |
| 2008/0036848 A1 * | 2/2008 | Shiraishi | ....................... | 347/249 |
| 2008/0143814 A1 * | 6/2008 | Masui et al. | ................... | 347/249 |
| 2009/0009582 A1 * | 1/2009 | Shiraishi | ....................... | 347/249 |
| 2009/0015885 A1 * | 1/2009 | Kondo | ........................... | 358/481 |

FOREIGN PATENT DOCUMENTS

| | | | |
|---|---|---|---|
| JP | 3-231610 | A | 10/1991 |
| JP | 6-320786 | A | 11/1994 |
| JP | 3231610 | B2 | 9/2001 |
| JP | 2004-230856 | A | 8/2004 |
| JP | 2004-262126 | A | 9/2004 |
| JP | 2004-268503 | A | 9/2004 |
| JP | 2005-111972 | A | 4/2005 |
| JP | 2006-205400 | A | 8/2006 |

* cited by examiner

*Primary Examiner* — Negussie Worku
(74) *Attorney, Agent, or Firm* — Rossi, Kimms & McDowell LLP

(57) ABSTRACT

A scanning optical apparatus includes, for example, a determination unit, a correction unit, a creating unit, and a drive control unit. The determination unit determines an amount of correction of an image clock for controlling an output timing of a beam for each pixel constituting one line in a main scanning direction of the beam. The correction unit corrects the image clock in accordance with the amount of correction that is determined. The creating unit creates an image signal that is utilized for driving a light source in accordance with the image clock that is corrected. The drive control unit controls driving of the light source in accordance with the image signal.

10 Claims, 29 Drawing Sheets

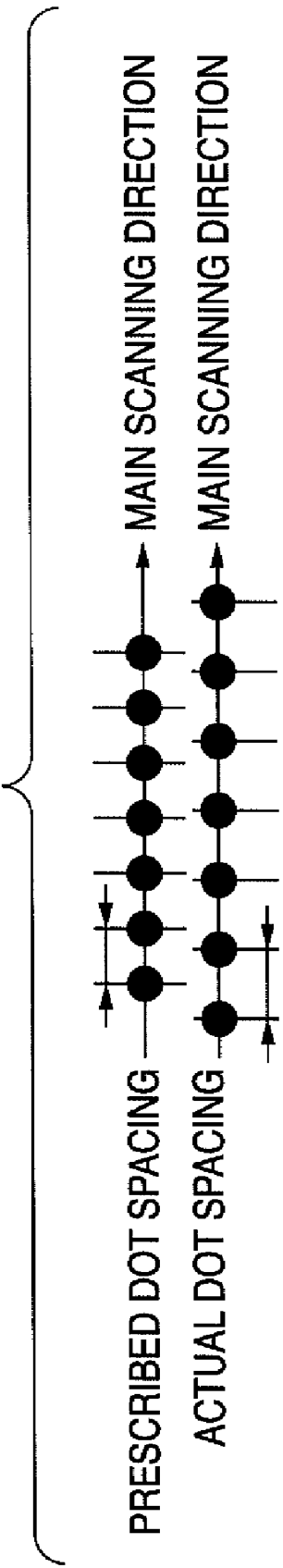

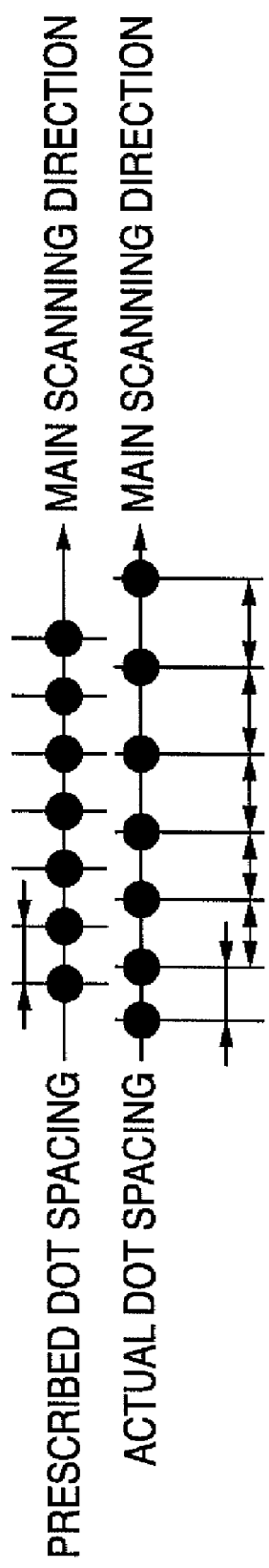

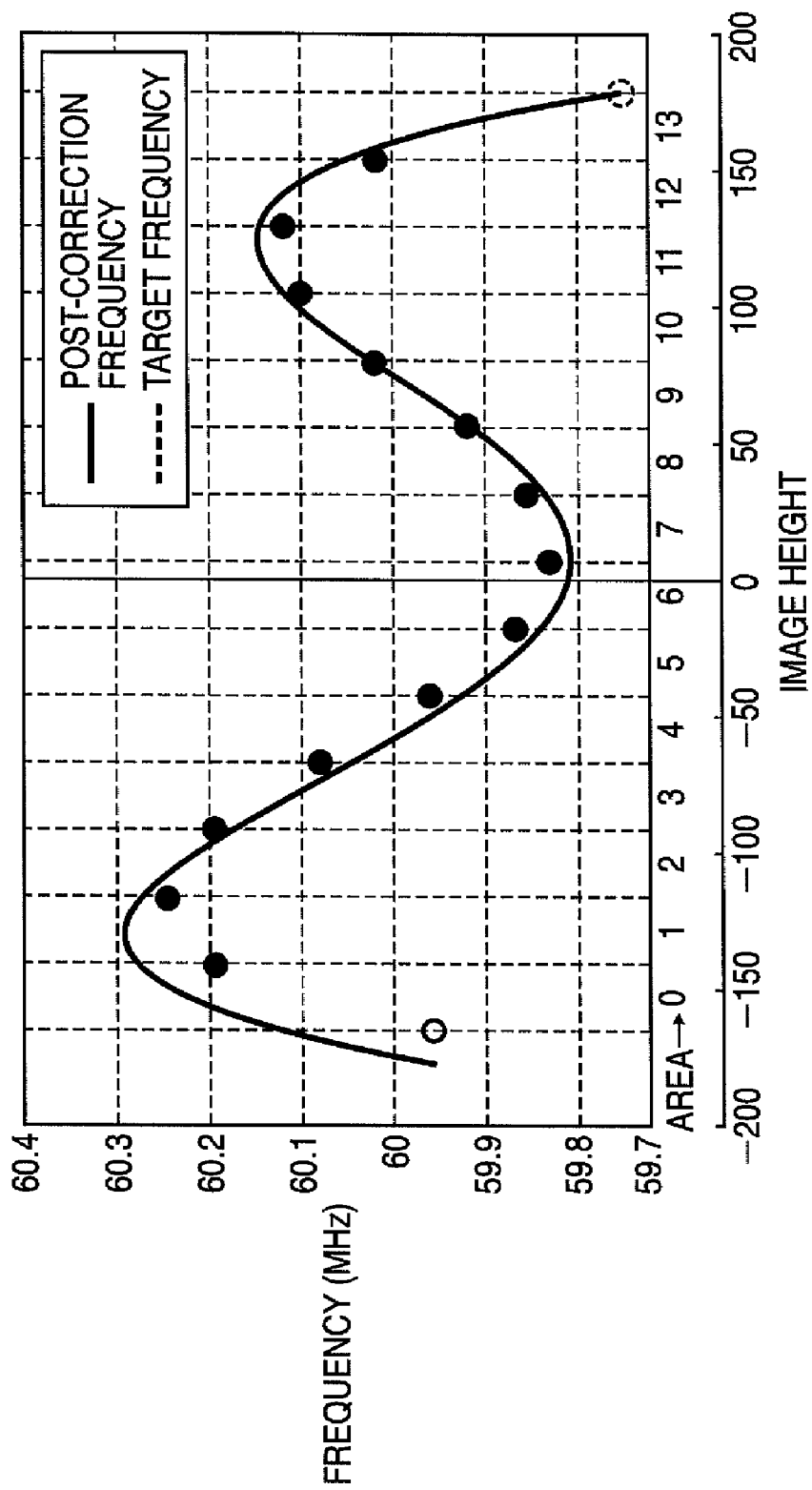

FIG. 11

| AREA | INITIAL FREQUENCY IN AREA (MHz) | CHANGE TIME FOR EACH PIXEL (ps) | CHANGE RATE DATA |
|---|---|---|---|
| 0 | 59.9588 | −0.1256 | F8 |
| 1 | 60.2362 | −0.0261 | FE |
| 2 | 60.2940 | 0.0330 | 02 |
| 3 | 60.2208 | 0.0599 | 04 |
| 4 | 60.0883 | 0.0617 | 04 |
| 5 | 59.9524 | 0.0457 | 03 |
| 6 | 59.8522 | 0.0190 | 01 |
| 7 | 59.8108 | −0.0109 | FF |
| 8 | 59.8347 | −0.0363 | FE |
| 9 | 59.9143 | −0.0497 | FD |
| 10 | 60.0234 | −0.0437 | FD |
| 11 | 60.1200 | −0.0114 | FF |
| 12 | 60.1451 | 0.0550 | 03 |
| 13 | 60.0237 | 0.1641 | 0A |
| 14 | 59.6646 | — | — |

FIG. 19

| AREA | DERIVATION COEFFICIENT |
|---|---|
| 0 | 0.001037 |
| 1 | 0.000886 |
| 2 | 0.000734 |
| 3 | 0.000582 |
| 4 | 0.000431 |
| 5 | 0.000280 |
| 6 | 0.000128 |
| 7 | −0.000024 |
| 8 | −0.000176 |
| 9 | −0.000327 |
| 10 | −0.000479 |
| 11 | −0.000631 |
| 12 | −0.000782 |
| 13 | −0.000934 |
| 14 | − |

FIG. 20

| AREA | DERIVATION COEFFICIENT |
|:---:|:---:|
| 0 | −0.002193 |
| 1 | 0.002578 |
| 2 | 0.003694 |
| 3 | 0.002625 |
| 4 | 0.000571 |
| 5 | −0.001542 |
| 6 | −0.003060 |
| 7 | −0.003600 |
| 8 | −0.003049 |
| 9 | −0.001572 |
| 10 | 0.000400 |
| 11 | 0.002159 |
| 12 | 0.002728 |
| 13 | 0.000859 |
| 14 | − |

SCANNING OPTICAL APPARATUS, IMAGE FORMING APPARATUS AND IMAGE CLOCK CORRECTION METHOD

BACKGROUND OF THE INVENTION

1. Field of the Invention

The present invention relates to a scanning optical apparatus, an image forming apparatus, and an image clock correction method that is applied to a scanning optical apparatus.

2. Description of the Related Art

A scanning optical apparatus that is utilized with an image forming apparatus or the like scans a beam along a main scanning direction. The main scanning direction is the axial direction (lengthwise direction) of a photosensitive member. Particularly in an electrophotographic image forming apparatus, a scanning optical apparatus modulates a beam with an image signal, and a polygonal mirror, which is driven by a motor, rotates and deflects the modulated beam to scan a scanning plane on a photosensitive member.

In this kind of image forming apparatus, it is desirable that the magnification ratio in the main scanning direction is always an ideal magnification ratio. However, a so-called "shift of variable magnification ratio" occurs due to a mounting error when mounting a scanning optical apparatus onto an image forming apparatus, limits of accuracy of the instrument in use (refractive index fluctuations) or errors when assembling an optical component such as a reflection mirror or an f-θ lens. A shift of the variable magnification ratio is undesirable because it becomes a cause of image distortion. In particular, a color image forming apparatus forms a color image by multiple-transferring toner images of each color on a transfer member. Therefore, if the amount of a shift of the variable magnification ratio is different for each color, it becomes a cause of color misalignment. As a results, the image quality deteriorates undesirably.

Japanese Patent Laid-Open No. 2005-111972 discloses a technique of dividing the main scanning direction in a plurality of areas, adjusting the position of the image clock for each area, and correcting the magnification ratio components of the areas which differ from one another due to optical components or the like.

SUMMARY OF THE INVENTION

However, according to Japanese Patent Laid-Open No. 2005-111972, it appears to be difficult to increase the correction accuracy since the main scanning direction is divided into units of areas comprising a plurality of pixels and an image clock is corrected for each area. Thus, a feature of the present invention is to solve at least one of problems among the above-described problem and other problems. The other problems will be understood from the specification and drawings overall.

The present invention is, for example, applied to a scanning optical apparatus that scans a scanning plane by rotating and deflecting a beam that is emitted from a light source. The scanning optical apparatus, for example, includes a determination unit, a correction unit, a creating unit and a drive control unit. The determination unit determines an amount of correction of an image clock for controlling an output timing of a beam, for each pixel that comprises one line in the main scanning direction of the beam. The correction unit corrects the image clock in accordance with the amount of correction that is determined. The creating unit creates an image signal that is utilized for driving a light source in accordance with the corrected image clock. The drive control unit controls driving of the light source in accordance with the image signal.

Further features of the present invention will become apparent from the following description of exemplary embodiments (with reference to the attached drawings).

BRIEF DESCRIPTION OF THE DRAWINGS

FIG. 3C is a view for describing a shift of the total magnification ratio;

FIG. 4B is a view for describing a single magnification component;

FIG. 10C is a graph that shows an example of frequency distribution;

FIG. 11 is a view that shows one example of change rate data that is calculated for each main scanning area;

FIG. 19 is a view that shows a calculation example of derivation coefficients that are calculated based on a partial magnification ratio; and FIG. 20 is a view that shows a calculation example of derivation coefficients that are calculated based on change rate data with respect to a default.

DESCRIPTION OF THE EMBODIMENTS

An embodiment of the present invention is described hereunder. Naturally, the individual embodiment described hereunder will be useful for understanding various concepts such as a superordinate concept, an intermediate concept, and a subordinate concept of the present invention. Further, the technical scope of the present invention is defined by the claims and is not limited by the individual embodiments described below.

First Embodiment

Figure 1:
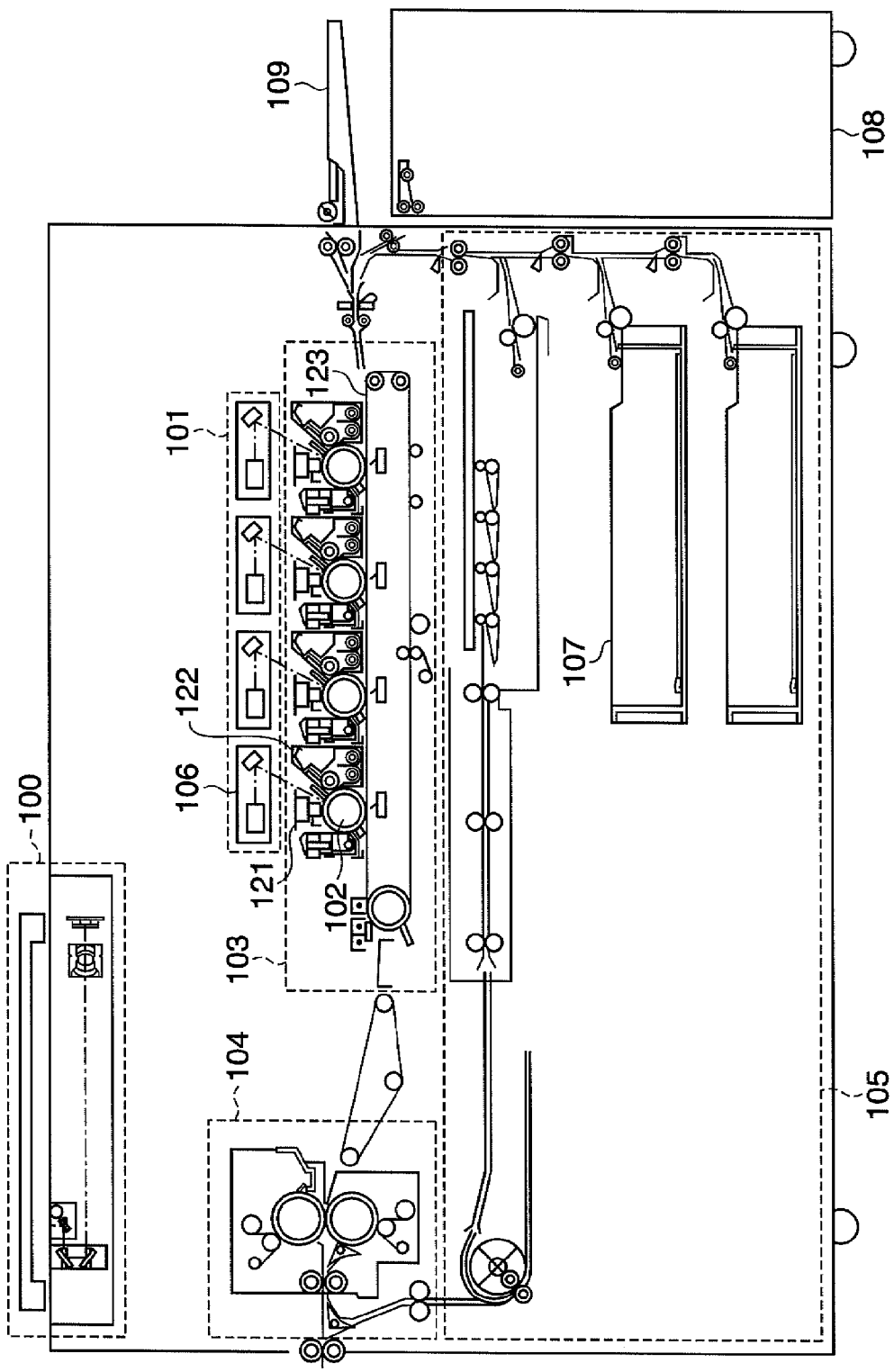
FIG. 1 is a schematic sectional view of an image forming apparatus according to the embodiments.

FIG. 1 is a schematic sectional view of an image forming apparatus according to this embodiment. The image forming apparatus of the present invention can be implemented, for example, as a printing apparatus, a printer, a copier, a multi-functional peripheral, or a facsimile. In this case the image forming apparatus is described as a copier. The image forming apparatus comprises an image reader unit 100, a laser exposure unit 101, an image forming unit 103, a fixing unit 104, a sheet supply/conveying unit 105, and an unshown printer control unit that controls these. The image forming unit 103 comprises a photosensitive drum 102, a charging device 121, and a developing unit 122. The photosensitive drum 102 is an example of an image carrier that is scanned with a beam by a scanning optical apparatus such as the laser exposure unit 101. The charging device 121 is one example of a unit that uniformly charges the surface of the photosensitive drum 102. A latent image is formed by exposing and scanning the surface (scanning plane) of the uniformly charged photosensitive drum 102 with a beam that is modulated in accordance with image data. The developing unit 122 is a unit that develops a latent image that is formed on the image carrier into a developer image. Further, the image forming unit 103 comprises a transfer unit for transferring a developer image onto a recording medium. The transfer unit comprises a transfer belt 123 as a transfer member. The image forming unit 103 transfers a developer image that is formed on the photosensitive drum 102 onto a recording medium that is conveyed by the transfer belt 123. In this connection, a recording medium may also be referred to as a recording material, a paper, a sheet, a transferring material, and a transferring paper.

As is well known, the image reader unit 100 is a unit that optically reads an original image from an original that is placed on the original plate and converts the original image into electric signals to create image data. A scanning optical apparatus according to the present invention can be adopted for the laser exposure unit 101. The laser exposure unit 101 scans a scanning plane on the photosensitive drum 102 by rotating and deflecting a beam such as a laser beam that is emitted from a light source such as a laser, using a polygonal mirror 106 that rotates at an equiangular speed. Naturally, the beam is modulated in accordance with the image data.

The image forming unit 103 for forming a color (multi-color) image comprises a plurality of developing stations. The color of the developer in each developing station is different (for example: cyan (C), magenta (M), yellow (Y), and black (K)).

The fixing unit 104 is a unit that heats and fixes a developer image that is formed on a recording medium. The sheet supply/conveying unit 105 is a unit that supplies and conveys a recording medium. A sheet storage that is typified by a sheet cassette 107 or a paper deck 108 and a manual feed tray 109 stores a plurality recording media. The sheet supply/conveying unit 105 separates the recording media, one sheet at a time, and supplies each recording medium to the image forming unit 103. The sheet supply/conveying unit 105 also conveys the recording medium from the image forming unit 103 to the fixing unit 104 and ultimately discharges the recording medium from the machine.

Figure 2:
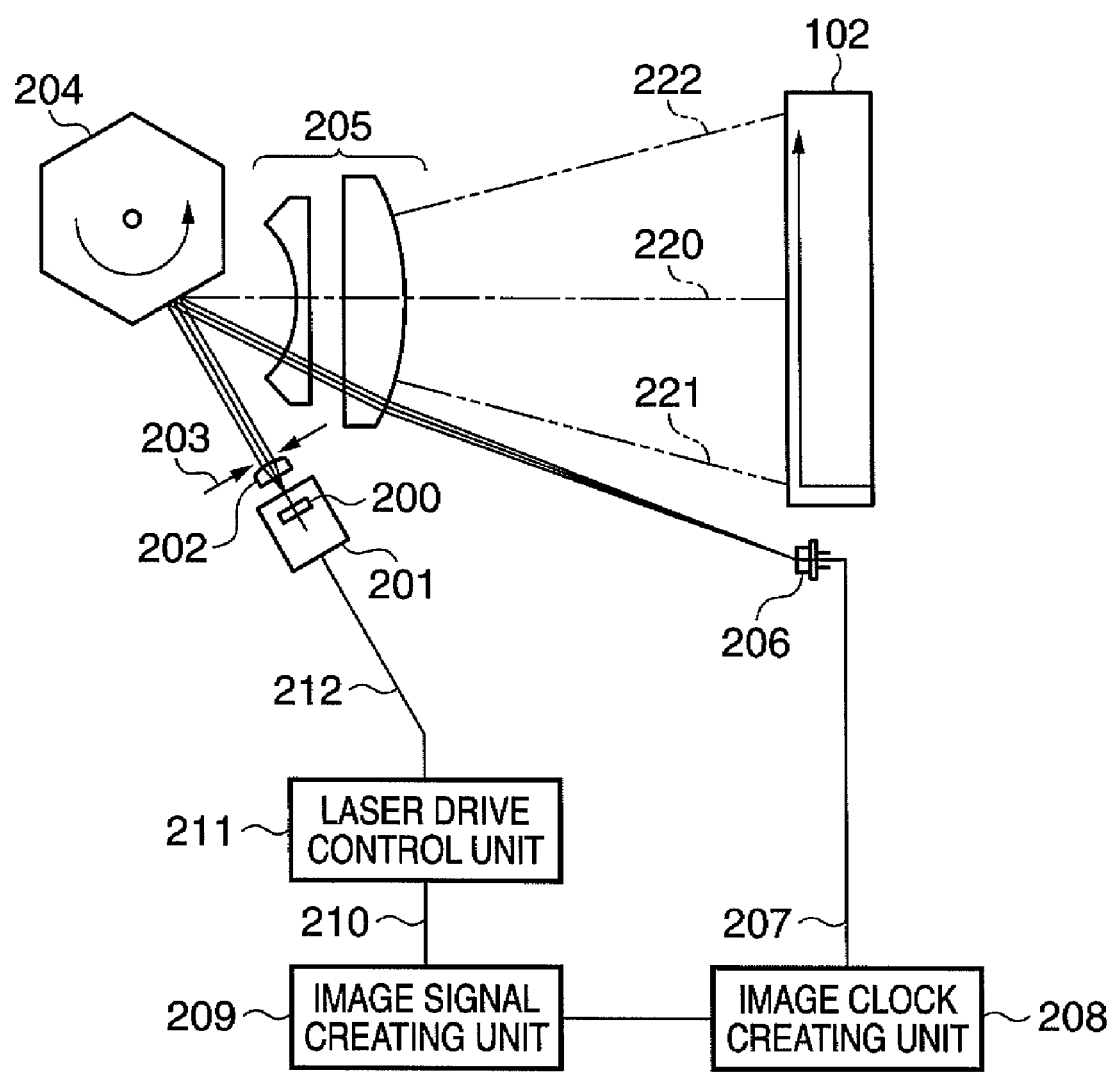
FIG. 2 is a view that illustrates one example of a laser exposure unit 101 according to the embodiments.

FIG. 2 is a view that shows one example of the laser exposure unit 101 according to the present embodiment. A semiconductor laser 200 is one example of a light source. A laser driver 201 is an apparatus for driving the semiconductor laser 200. Beams (laser beams) that are emitted from the semiconductor laser 200 pass through a collimator lens 202 and an aperture 203 to make the beams substantially parallel, and are then irradiated onto a polygonal mirror 204. The polygonal mirror 204 is a so-called polygonal mirror, and is a unit that rotates and deflects the beams that are emitted from the light source. An f-θ lens 205 has a condensing action and is also a unit for ensuring the temporal linearity of scanning. As a result, the beams move at constant speed on a scanning plane on the photosensitive drum 102.

A BD sensor 206 is one example of a detection unit that detects the start timing of writing in the main scanning direction of a photosensitive drum that is conducted by receiving the light of a beam from the polygonal mirror 204. A detection signal 207 that is output from the BD sensor 206 is used as a synchronization signal for synchronizing rotation of the polygonal mirror 204 with writing of data.

The image clock creating unit 208 is a unit that creates an image clock of a constant frequency that is synchronized with a synchronization signal that is output from the BD sensor 206. An image signal creating unit 209 is one example of a creating unit that creates an image signal 210 to be utilized for driving a light source, in accordance with an image clock that is output from the image clock creating unit 208. A laser drive control unit 211 is one example of a drive control unit that controls driving of the semiconductor laser 200 in accordance with the image signal 210.

A straight line 220 indicates an optical path when a beam exposes a center position of a scanned plane of the photosensitive drum 102. In this connection, the scanned plane is actually a single line having a width that is equivalent to the width of the beam. Straight lines 221 and 222 indicate the optical paths of beams when exposing the two edges (edge on the BD sensor side and edge on the opposite side thereof) of a maximum image forming area. In this connection, the term "image height" refers to coordinates of an exposure position (image formation position) when the center position of the scanned plane is taken as the origin. As is evident from the figure, an image height at a position on the scanned plane that is closer to the BD sensor 206 side than the center position will have a negative value. In contrast, an image height at a position on the scanned plane that is closer to the opposite side of the BD sensor 206 than the center position will have a positive value.

[Reason for Correcting Image Clock]

As described above, a so-called "shift of variable magnification ratio" occurs due to a mounting error when mounting a scanning optical apparatus onto an image forming apparatus or refractive index fluctuations of an f-θ lens. It is sufficient to correct the image clock to correct this shift of the variable magnification ratio.

Figure 3A:
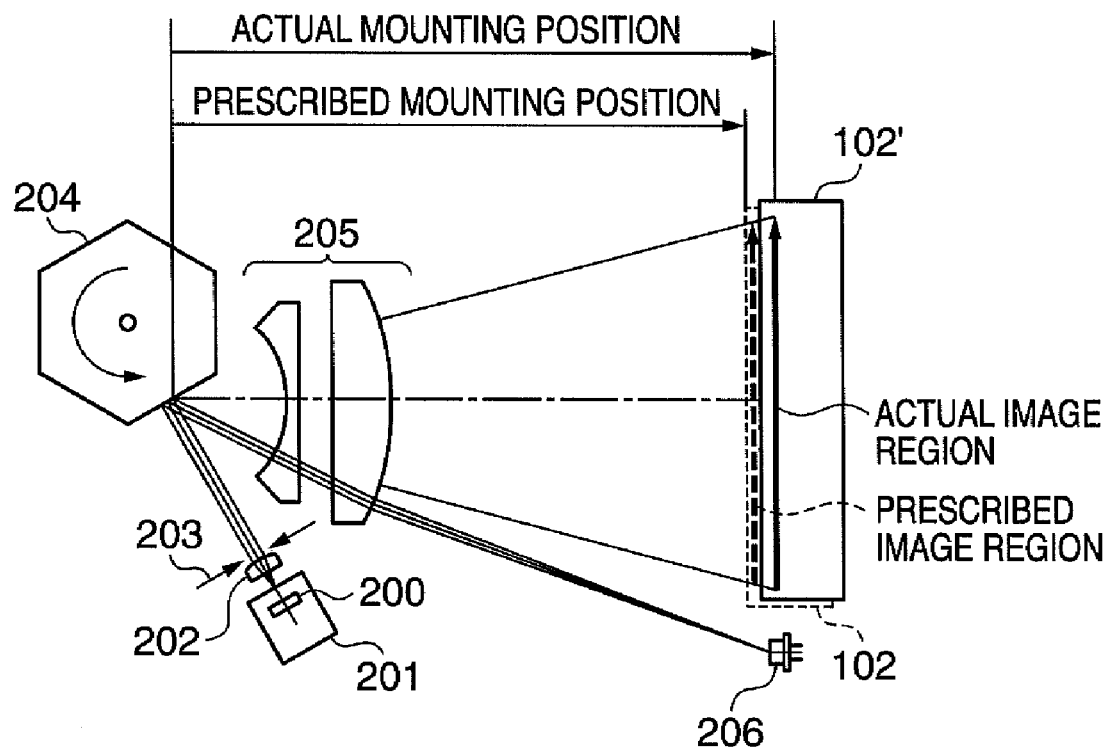
FIG. 3A is a view for describing a shift of the total magnification ratio.

FIG. 3A is a view for describing a shift of the total magnification ratio among components included in a shift of the variable magnification ratio. The term "shift of total magnification ratio" refers to a shift of the total magnification ratio that occurs when an optical path length changes when a scanning optical apparatus moves in parallel with the vertical or horizontal direction with respect to the scanned plane (surface of the photosensitive drum 102). A shift amount at this time is referred to as "total magnification ratio component". In this connection, the term "total magnification ratio" refers to the magnification ratio of one line in the main scanning direction (actual length of one line/ideal length of one line).

In the figure, reference numeral 102 denotes the photosensitive drum when the laser exposure unit 101 is mounted at a prescribed mounting position. Reference numeral 102' denotes the photosensitive drum with respect to the actual mounting position of the laser exposure unit 101. In the case illustrated in FIG. 3A, an optical path length corresponding to the actual mounting position is longer than an optical path length corresponding to the prescribed mounting position.

Figure 3B:
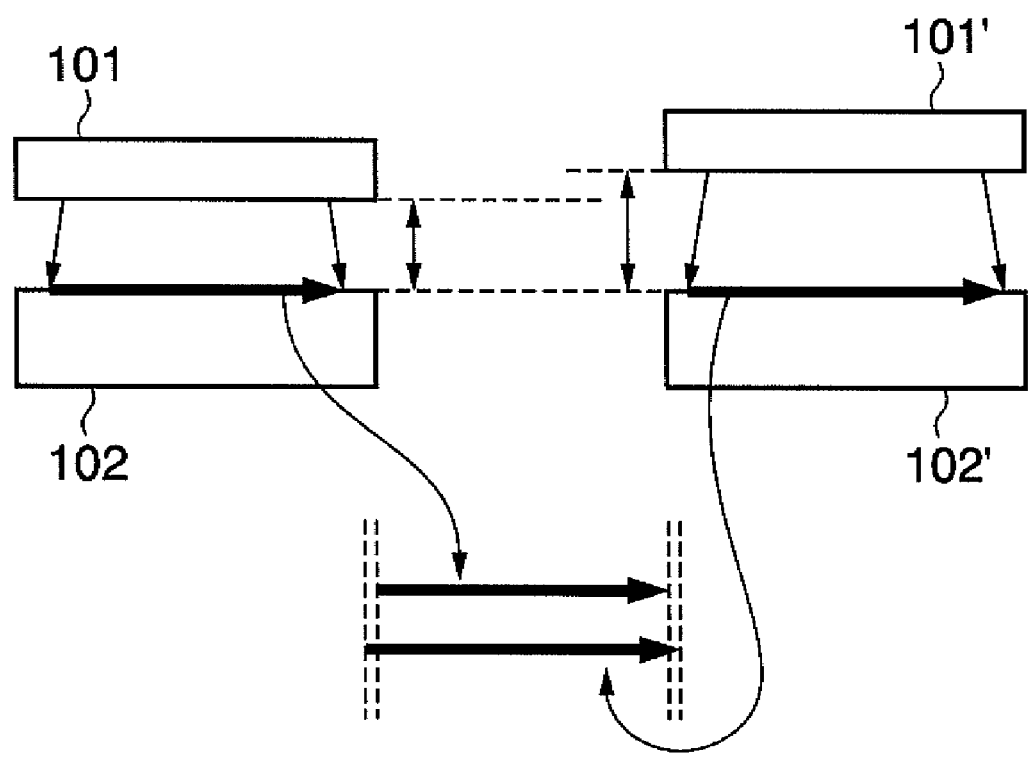
FIG. 3B is a view for describing a shift of the total magnification ratio.

FIG. 3B is a view for describing the total magnification ratio component. This view illustrates the state when the photosensitive drum 102 and the laser exposure unit 101 shown in FIG. 1 are viewed from the manual feed tray 109. The relation between the photosensitive drum 102 and the laser exposure unit 101 in the prescribed case is illustrated on the left side of FIG. 3B. The actual relation between a photosensitive drum 102' and a laser exposure unit 101' is illustrated on the right side of FIG. 3B. As will be understood from the figure, the actual optical path length becomes longer than the prescribed optical path length. Therefore, the actual length of one line that is formed on the scanned plane becomes longer than the prescribed length. More specifically, the actual magnification ratio becomes larger than the prescribed magnification ratio.

FIG. 3C is a view describing a total magnification ratio component. In the figure, the term "prescribed dots" refers to dots with prescribed spaces there between that are formed when the laser exposure unit 101 is disposed at the prescribed position. In contrast, actual dots are dots that are recorded when the laser exposure unit 101 is disposed at a position that is different to the prescribed position. An image signal for forming the dots is the same in both cases. As will be understood from the figure, the actual dot spaces extend at the same magnification ratio with respect to all of the dots.

Figure 3D:
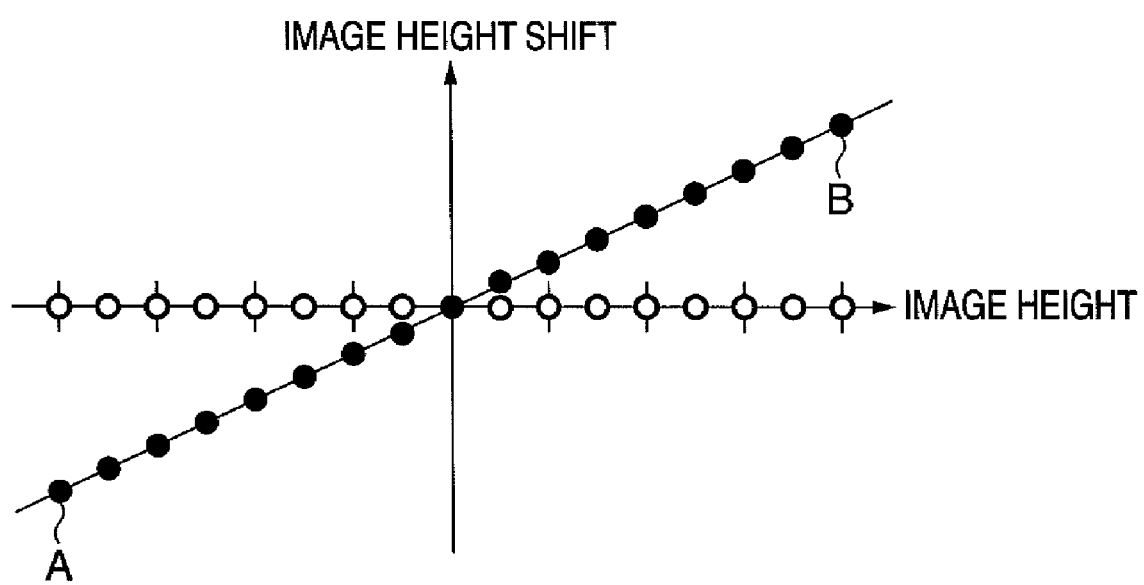
FIG. 3D is a graph that represents the relation between an ideal image height and an image height shift due to a shift of the total magnification ratio.

FIG. 3D is a graph that represents the relation between an ideal image height and an image height shift caused by a shift of the total magnification ratio. The abscissa represents ideal image heights (ideal values of image height) in the main scanning direction. The point of origin of the abscissa corresponds to the center position on the photosensitive drum 102. The negative direction on the abscissa indicates that the position is nearer the BD sensor than the center position. Further, the positive direction on the abscissa indicates that the position is nearer the opposite side of the BD sensor than the center position. The ordinate represents shift amounts from the ideal image heights in the main scanning direction. The positive direction of the ordinate indicates that an exposure position shifts to the opposite side of the BD sensor. The negative direction of the ordinate indicates an exposure position shifts to the BD sensor side.

The gradient in this graph represents the magnification ratio. For example, in FIG. 3D, reference character A is taken to denote a position at which the image height is −150 mm and the image height shift amount is −0.1 mm, and reference character B is taken to denote a position at which the image height is +150 mm and the image height shift amount is +0.1 mm. In this case, the scanning length is 300 mm and the image height shift amount is +0.2 mm. That is, since the actual scanning length is 300.2 mm with respect to an ideal scanning length of 300 mm, the magnification ratio is 300.2/300=100.07%. To correct this kind of total magnification ratio component, the period of the image clock can be uniformly multiplied by 1/1.0007 (in terms of the image clock frequency, uniformly multiplied by 1.0007).

Figure 4A:
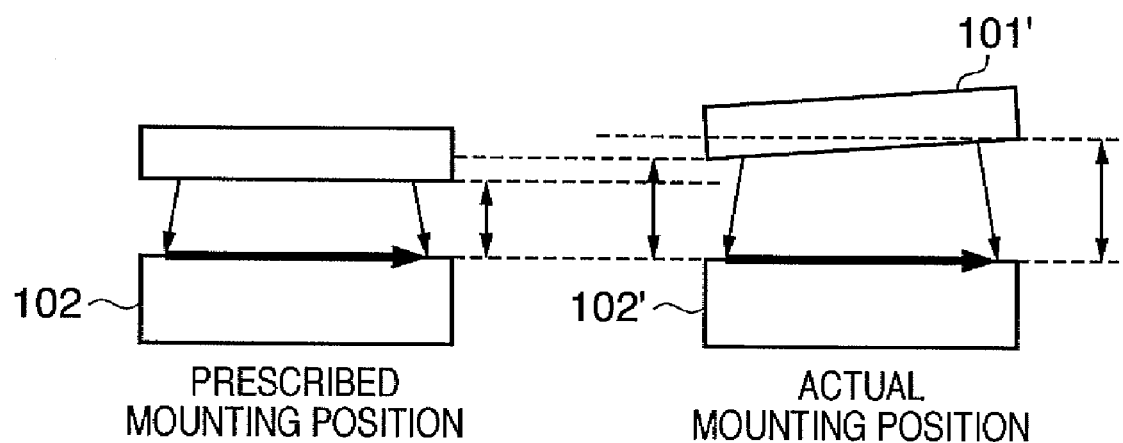
FIG. 4A is a view for describing a shift of a single magnification component.

FIG. 4A is a view for describing a shift of a single magnification component that is one shift of variable magnification ratio. As will be understood from comparing FIG. 4A with FIG. 3B, a laser exposure unit 101' is mounted in a condition in which it inclines from the horizontal plane. Therefore, the optical path length between the laser exposure unit 101' and the photosensitive drum 102' differs according to the image height. That is, the optical path lengths at the left edge and the optical path length at the right edge of the scanned plane on the photosensitive drum 102 are different. Thus, the term "shift of a single magnification component" refers to a shift from an ideal magnification ratio that occurs when the optical path lengths change depending on the image height as a result of the scanning optical apparatus and the scanned plane no longer being parallel. A shift amount at this time is called a "single magnification component".

FIG. 4B is a view for describing a single magnification component. In a case including a single magnification component, the actual spaces between dots do not become constant and monotone increasing or monotone decreasing occurs in accordance with the image height. In FIG. 4B, it can be understood that the spaces between dots gradually increase from left (BD sensor side) to right (opposite side to BD sensor).

Figure 4C:
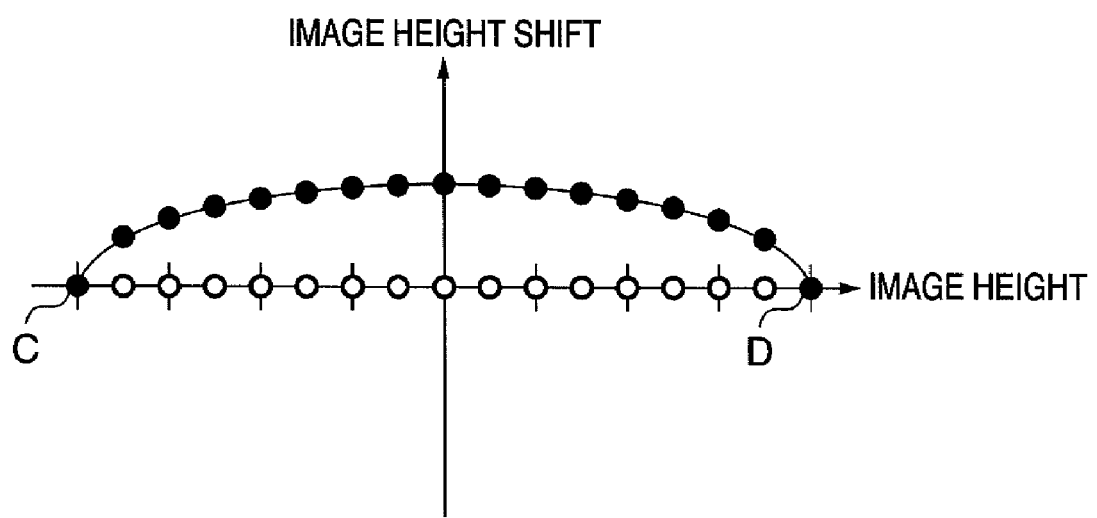
FIG. 4C is a graph that represents the relation between an ideal image height and an image height shift due to a shift of a single magnification component.

FIG. 4C is a graph that represents the relation between an ideal image height and an image height shift caused by a shift of a single magnification component. Further, in this case, at the points denoted by reference characters C and D in the figure, the relation between the image height and the image height shift is shown when an image clock is adjusted to correctly correspond with the total magnification ratio. As will be understood from the figure, the scanning length from point C to point D is the same for the ideal case and the case including a single magnification component. However, an image height shift occurs in the space between point C and point D. This single magnification component is generally represented by a quadratic function.

Figure 4D:
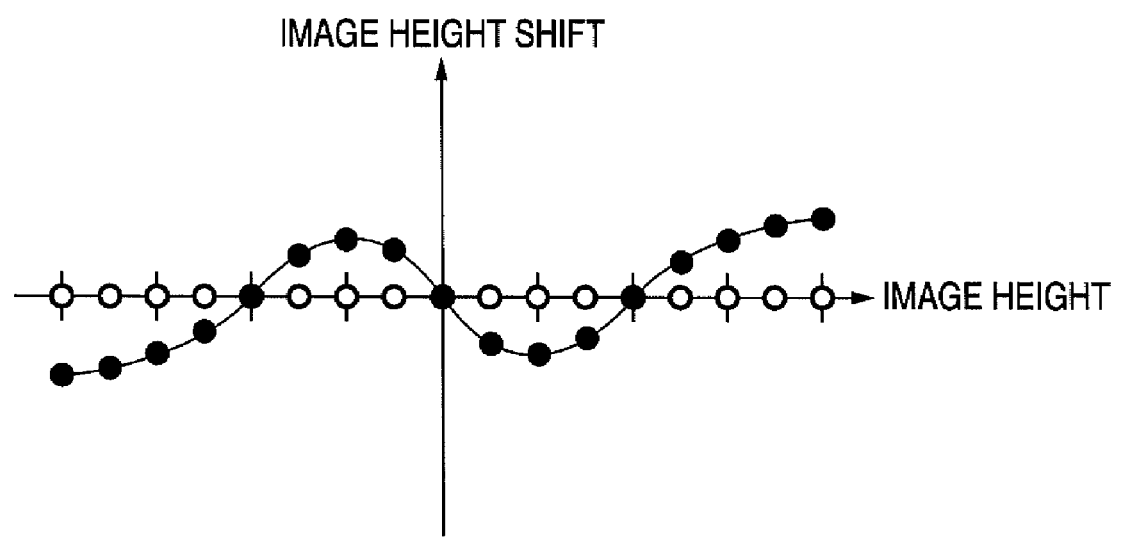
FIG. 4D is a graph that represents the relation between an ideal image height and an image height shift when a shift of an fθ magnification ratio occurs.

FIG. 4D is a graph that represents the relation between ideal image height and image height shift when a shift of an fθ magnification ratio occurs. The term "shift of an fθ magnification ratio" refers to a shift of variable magnification ratio that occurs when an actual laser wavelength shifts from an ideal wavelength (design center value) If the laser wavelength coincides with the design center value, the fθ lens can convert the equiangular velocity motion of the polygonal mirror into uniform motion on the photosensitive drum. However, in actuality the wavelengths differ for each laser (normally, there is a fluctuation of about ±10 nm). Particularly, when the wavelength deviates from the design center value, since scanning of the beam is no longer a uniform motion, a shift of variable magnification ratio occurs. The shift of variable magnification ratio at this time is, in particular, called an fθ component. As shown in FIG. 4D, an fθ component is, for example, approximated by a 5th degree polynomial.

Thus, components that comprise a shift of variable magnification ratio include a total magnification ratio component (linear function), a single magnification component (quadratic function), and an fθ component (5th degree polynomial). Hence, the shift of variable magnification ratio in total is also a 5th degree polynomial.

[Method of Correcting Shift of Variable Magnification Ratio]

Figure 5:
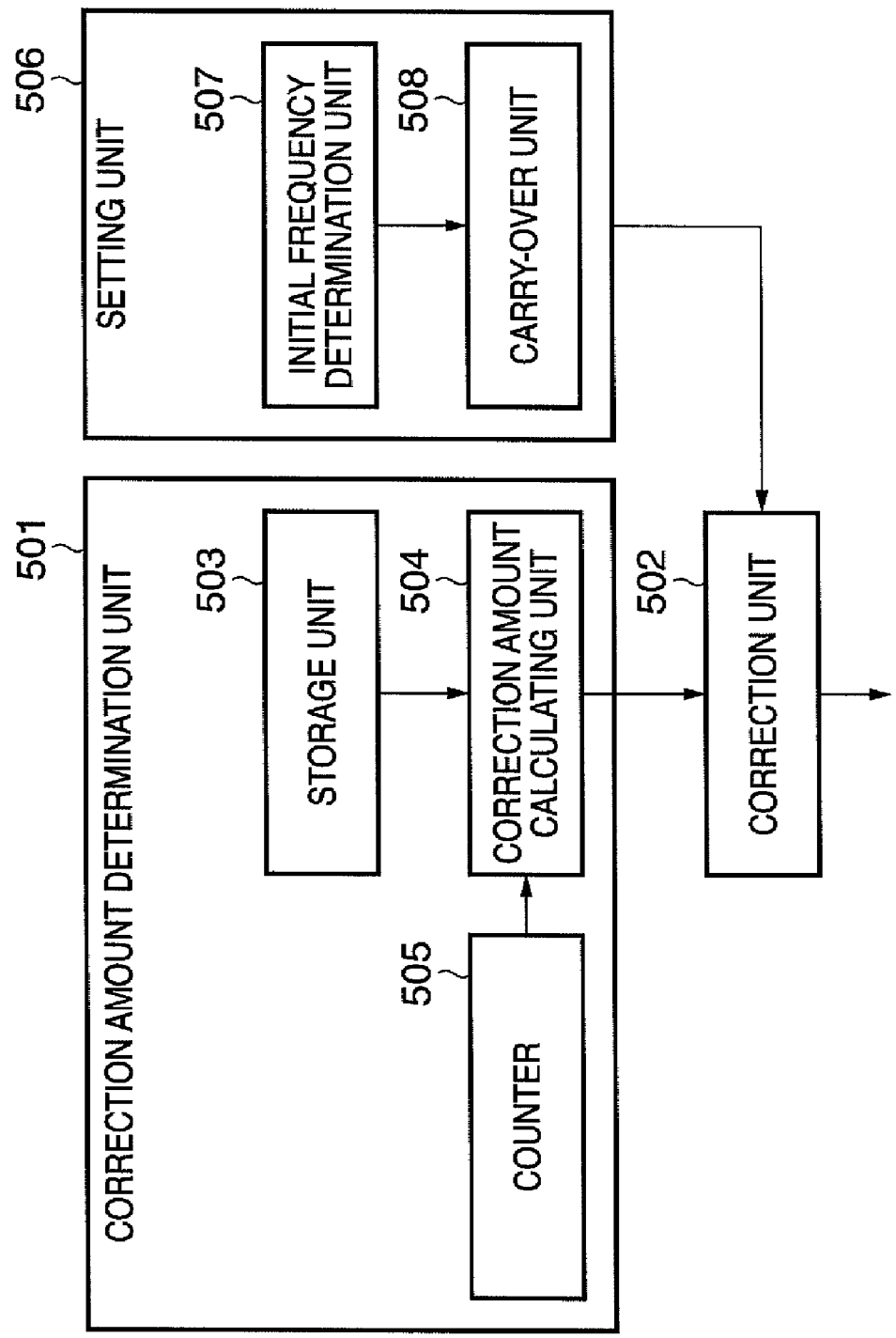
FIG. 5 is a view showing one example of an image clock creating unit according to the embodiments.

FIG. 5 is a view that illustrates one example of an image clock creating unit according to the present embodiment. Each unit may be implemented by a dedicated circuit such as an ASIC or may be implemented by a CPU, a ROM, a RAM and a computer program. A correction amount determination unit 501 determines an amount of correction of an image clock for controlling an output timing of a beam from the semiconductor laser 200 for each pixel comprising one line in the main scanning direction of the beam. A correction unit 502 corrects an image clock for each pixel in accordance with the amount of correction that is determined. Since the image clock is corrected for each pixel, it is easier to cut a correction residue than in a conventional method that performs correcting for each area comprising a plurality of pixels.

The correction amount determination unit 501, for example, includes a storage unit 503, a correction amount calculating unit 504, and a counter 505. The storage unit 503 stores change rate data of amounts of correction that are applied to pixels included in a main scanning area for each main scanning area formed by dividing one line in a main scanning direction into a plurality of lines. The change rate data is data that represents the rate of change of an amount of correction that is applied to each pixel. For each main scanning area, the correction amount calculating unit 504 reads out the corresponding change rate data from the storage unit 503 and calculates the amount of correction for each pixel in accordance with the change rate data that is read out. According to the method described in Japanese Patent Laid-Open No. 2005-111972, since a register is required for each area, a larger numbers of registers are necessary if the number of areas is increased in order to reduce the correction residue. Further, according to the method described in Japanese Patent Laid-Open No. 2005-111972, if the registers are reduced the correction residue will increase. With the present embodiment, there is the advantage that, by calculating the amount of correction for each pixel belonging to the relevant main scanning area from the change rate data that is prepared for each main scanning area, the correction residue can also be reduced while reducing the number of registers.

For example, for each main scanning area forming one line in the main scanning direction, the correction amount calculating unit 504 calculates an amount of correction that monotonically increases or monotonically decreases the frequency of the image clock in accordance with the change rate data corresponding thereto. This has the advantage that correction can be implemented by a comparatively simple arithmetic circuit.

The aforementioned BD (beam detector) sensor 206 functions as a detection unit that detects a start timing of main scanning by receiving the light of a beam. The counter 505 starts a count when the start timing of the main scanning (the aforementioned detection signal 207) is detected. When a count value of the counter 505 reaches a value indicating that scanning has switched from a certain main scanning area to the next main scanning area, the correction amount calculating unit 504 reads out the change rate data that corresponds to the next main scanning area from the storage unit 503. Thus, each time the main scanning area is switched, the corresponding change rate data can be read out.

A setting unit 506 sets an initial frequency of an image clock to be applied to a start pixel in each main scanning area. The setting unit 506, for example, comprises an initial frequency determination unit 507 and a carry-over unit 508. The initial frequency determination unit 507 determines the initial frequency of an image clock to be applied to a start pixel of a first main scanning area among a plurality of main scanning areas based on a total magnification ratio of one line in a main scanning direction. The carry-over unit 508 carries over a frequency that is applied to the final pixel of an immediately preceding main scanning area as the initial frequency to be applied to the respective start pixels in the second to the final main scanning areas among a plurality of main scanning areas.

Figure 6:
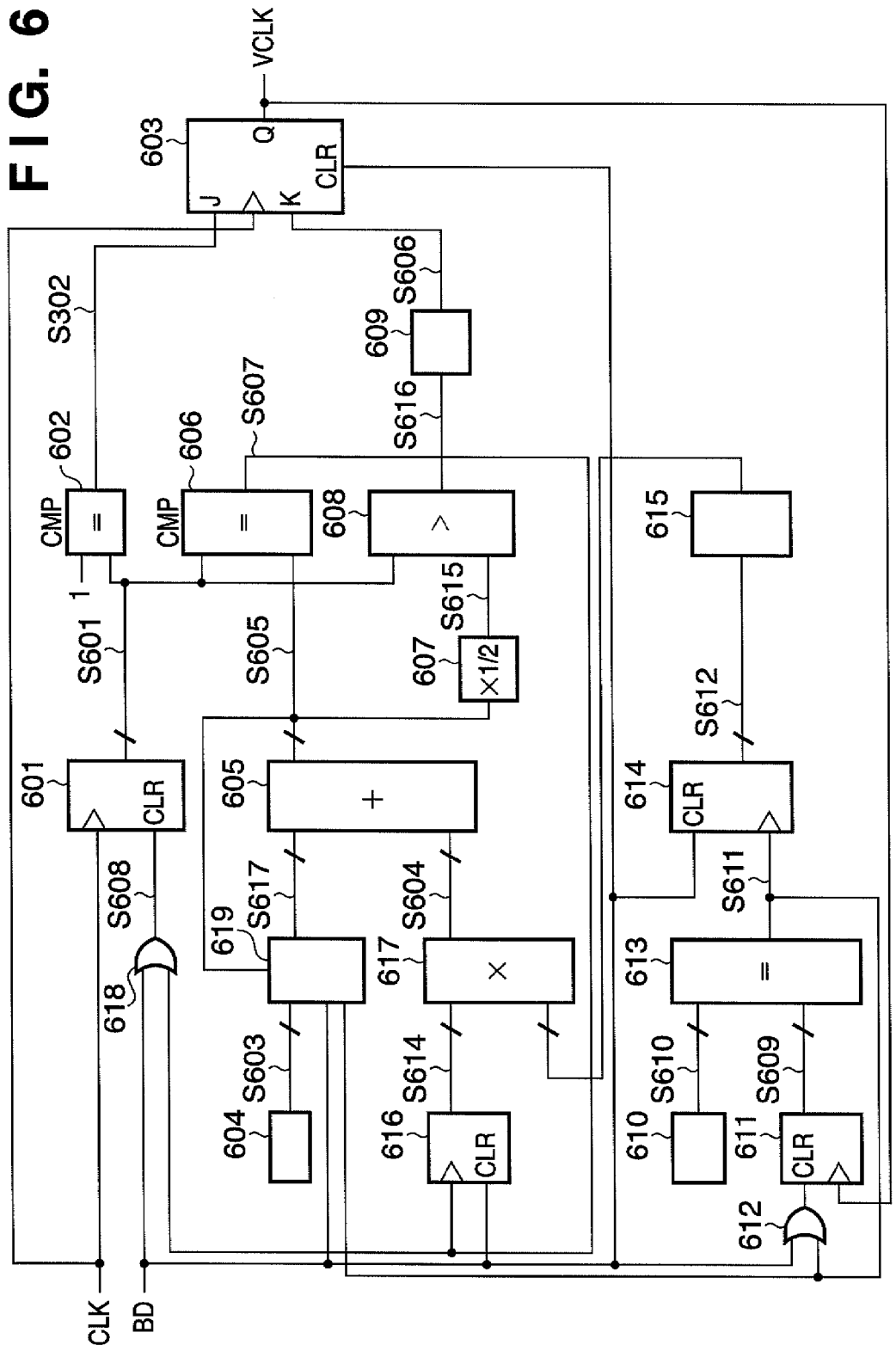
FIG. 6 is a circuit diagram that shows one example of principle parts of the image clock creating unit according to the embodiments.

FIG. 6 is a circuit diagram showing one example of principal parts of an image clock creating unit according to the present embodiment. CLK is a primary oscillation (primary) clock that is input from an unshown primary oscillator. The counter 601 counts the number of primary clocks that are input, and outputs the count value as count data S601 to a comparator 602. The comparator 602 compares the count data S601 with a constant (=1), and outputs a "high" signal S602 of the amount of one clock width of the primary clock CLK only when the count data S601 and the constant are equal. When the signal S602 is High, a JK flip-flop 603 outputs a High image clock VCLK in synchrony with the primary clock CLK.

The count data S601 is also input into a comparator 608. To switch an image clock VCLK that is "high" to "low", the comparator 608 compares the count data S601 with data S615 that is ½ of a signal S605 described later. An operator 607 is a multiplication circuit that multiplies the signal S605 by ½. When count data S601>data S615, the comparator 608 outputs the "high" signal S616 to a one-shot circuit 69. When the one-shot circuit 609 detects a transition from "low" to "high" in the input signal S616, it outputs a "high" signal S606 of the amount of one clock width of the primary clock CLK to the JK flip-flop 603. The JK flip-flop 603 changes to "low" an image clock VCLK that is "high" at the timing at which the signal S606 is input. Thus, a rise or fall in the image clock can be realized.

The counter 601 is also connected to a comparator 606. The comparator 606 compares the data S605 and the count data S601, and outputs a "high" signal S607 of the width of one clock of the primary clock CLK to an OR operator 318 only when the data S605 and the count data S601 are equal.

The OR operator 318 outputs the logical sum of the signal S607 and the BD signal (detection signal 207) to the counter 601 as a signal S608. When the signal S608 becomes "high", the counter 601 clears the count data. Through this series of operations the image clock creating unit creates one clock for the image clock VCLK.

The signal S607 that is output from the comparator 606 is input to a counter 616. The counter 616 counts up each time one clock is created for the image clock VCLK, and outputs a signal S614 indicating the count data. The signal S614 indicating the count data represents the number of a pixel in one main scanning area.

A multiplier 617 functions as a circuit that calculates the amount of correction of a pixel clock for each pixel. More specifically, the multiplier 617 outputs a signal S604 that represents the product of the signal S614 and change rate data S613 that is described later. Since the signal S614 monotonically increases, if the change rate data S613 is negative the value of the product monotonically decreases, and if the change rate data S613 is positive the value of the product monotonically increases.

A register 604 is a register that stores an initial frequency at the start timing of a main scanning (time the detection signal 207 is output). That is, information of the frequency to be applied to the start pixel of the first area among a plurality of areas comprising one line of the main scanning is stored in the register 604. More specifically, a value that represents initial clock/primary clock −1 hexadecimally, i.e. data S603 showing what clock amount of the primary clock that the initial clock represents is stored. The data S603 is input to a select circuit 619 at the following stage.

When the detection signal 207 (BD signal) is input, the select circuit 619 outputs signal S603 as a signal S617. Further, when an area complete signal S611 (described later) is input, the select circuit 619 outputs a signal S605 (described later). The select circuit 619 outputs the signal S617 at the main scanning start timing and outputs the signal S605 at the main scanning area complete timing.

An adder 605 is a circuit that corrects a pixel clock by adding an amount of correction to an initial frequency (target frequency). The adder 605 adds the signal S617 corresponding to the initial frequency and the signal S604 that is the output of the multiplier 617, and outputs a signal S605 as the sum. In this case it is assumed that the most significant bit of the signal S604 is a bit having the meaning of the code. Hence, if the most significant bit of the signal S604 is "1", the adder 605 subtracts the least significant bit, and if the most significant bit of the signal S604 is "0" the adder 605 adds the least significant bit.

Accordingly, by using this image clock creating unit, the image clock can be corrected for each pixel. That is, the image clock VCLK starts from an initial frequency that is set by the register 604 at the main scanning start timing. By increasing or decreasing the number of the primary clock CLK in accordance with the change rate data S613 each time the image clock VCLK advances by one clock, the period of the image clock VCLK expands or contracts.

Next, an operation that reads out the change rate data S613 for each area is described. The image clock VCLK that is created is also input to a counter 611. The counter 611 counts the image clock VCLK and outputs count data S609. In this connection, the counter 611 clears the count data in accordance with output from an OR operator 612 of the BD signal and a signal S611.

A register 610 stores area size data S610 that represents the size of each main scanning area with a number of pixels. A comparator 613 compares the count data S609 and the area size data S610, and outputs a "high" signal S611 of the width of one clock of the image clock VCLK only when the count data S609 and the area size data S610 are equal.

A counter 614 is an address counter that counts the signal S611 and outputs count data S612. The counter 614 is reset when a BD signal is input. A storage device 615 is an EEPROM or the like that stores change rate data for each main scanning area. The storage device 615 reads out the change rate data S613 corresponding to the input count data S612, and outputs the change rate data S613 to the multiplier 617.

Figure 7A:
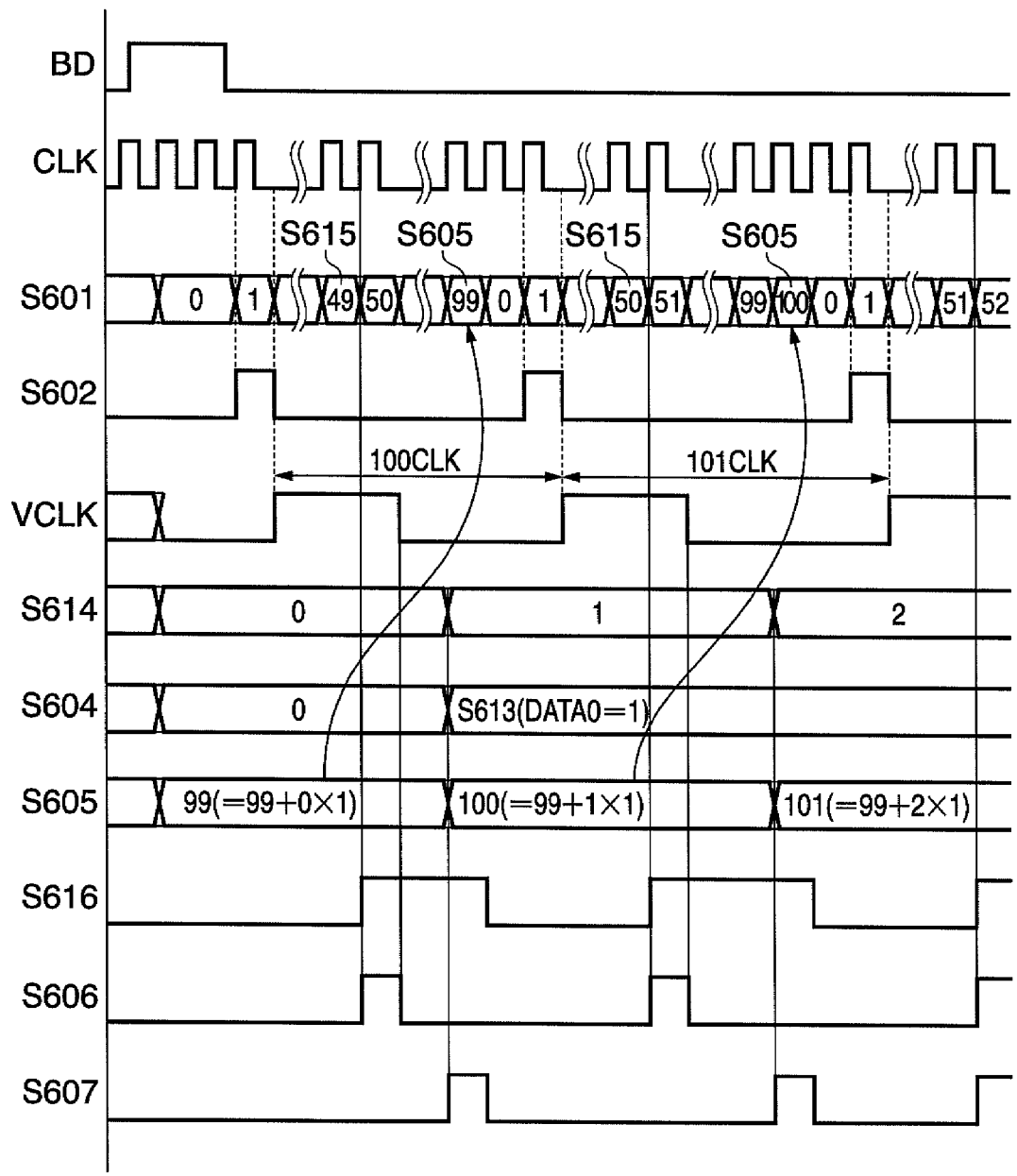
FIG. 7A is an enlarged view of a state from when a BD signal is input until two clocks of an image clock VCLK are created.
Figure 7B:
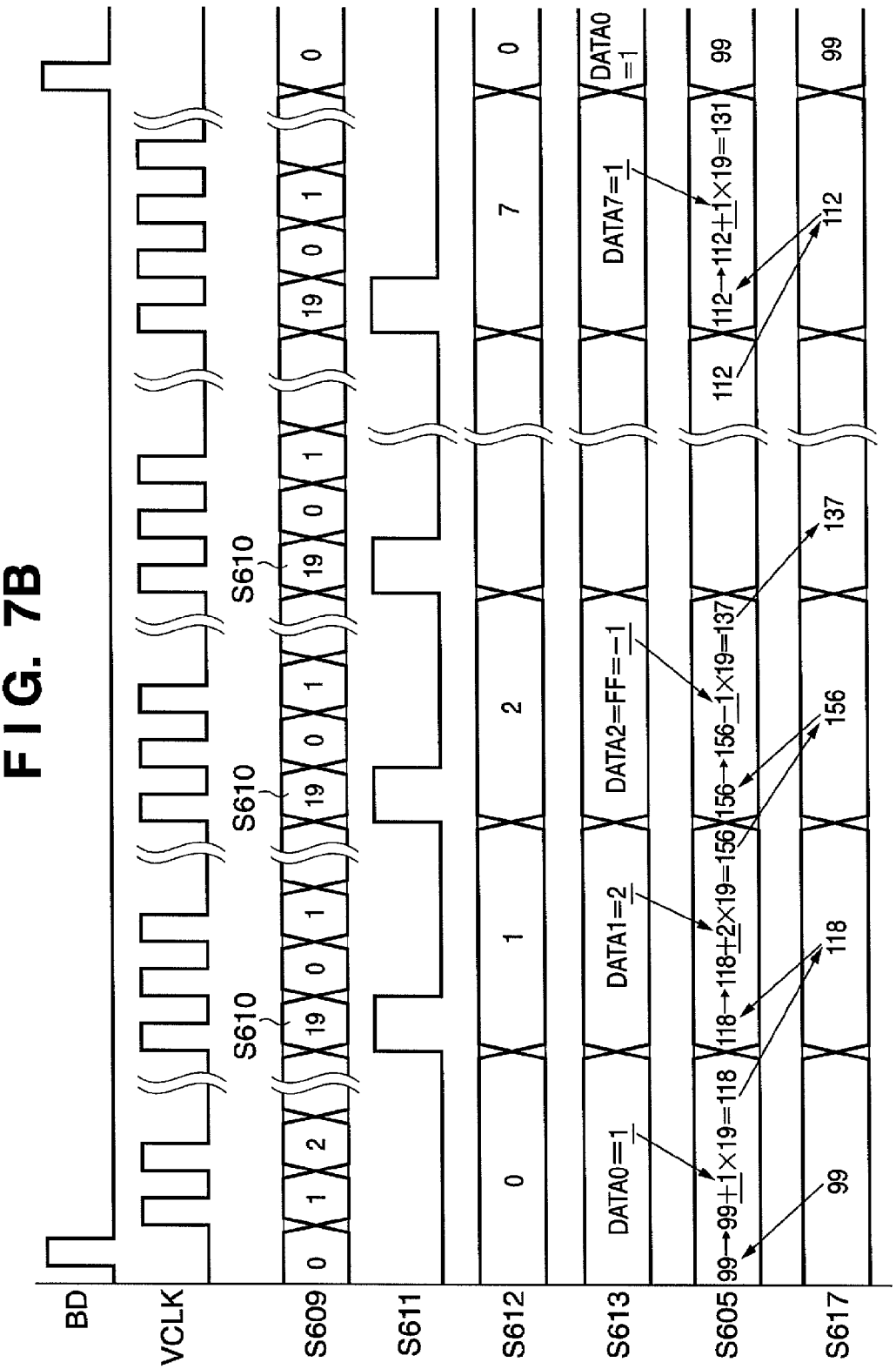
FIG. 7B is a time chart that relates to a plurality of main scanning areas.

Next, the details of the above described operations are described referring to FIGS. 7A and 7B. FIG. 7A is an enlarged view of a state from when a BD signal is input until two clocks of the image clock VCLK are created. In this case, as a specific example, a case is described in which the initial clock is an amount of 100 clocks of the primary clock, that is, the set value of the register 604 is 100−1=99, and the change rate data S613 of the first main scanning area is "1".

First, the counter 601 clears the count data S601 to "0" in accordance with input of a BD signal, and starts counting the primary clock CLK. When the count data S601 becomes "1", the comparator 602 outputs a "high" signal S602 of the width of one clock of the primary clock CLK. Thereupon, the JK flip-flop 603 sets the image clock VCLK to "high".

The counter 601 advances the count, and when the count data S601 reaches a value that is larger than ½ of the data S605 (at this time the value is 99)=49.5 (=S615), the comparator 608 outputs a "high" signal S616. The one-shot circuit 609 detects a rise of the signal S616 and outputs the signal S606. As a result of the signal S606, the aforementioned image clock VCLK becomes "low".

The counter 601 advances the count further, and when the count data becomes equal to the signal S605 (at this time the value is 99), the comparator 606 outputs the signal S607 indicating that the image clock VCLK has completed the amount of one clock. As a result of this signal S607, the count data S601 of the counter 601 is cleared to "0" and a count operation for creating the next image clock VCLK starts. The signal S607 is also used as a clock of the counter 616. Each time the signal S607 is input (each time the image clock VCLK is created), the counter 616 counts up. The signal S614 that indicates the count data that the counter 616 outputs is multiplied by the change rate data S613 (in this case, the change rate data of the initial area is "1") that is read out from an EEPROM 315 at the multiplier 617, and 1×1=1 is output for S604. This value and the signal S617 (=S603=99) that shows the set value of the initial clock are added to obtain the period (=99+1=100 CLK) of the second image clock VCLK. That is, the initial frequency that is applied to the immediately preceding pixel is carried over as the initial frequency of the next pixel.

The value (=50) of half of the period of the second image clock VCLK is output as signal S615. Thus, the duty of this image clock VCLK is 50%. Similarly, with respect to the third image clock VCLK, since the signal S614 from the counter 616 is "2", the period of the image clock VCLK is 101 CLK (=99+2×1). The above described operations are repeated until a single main scanning area is completed.

FIG. 7B is a time chart relating to a plurality of main scanning areas. In this case, the size of each main scanning area is taken to be 20 pixels (set value of register 610 is 20−1=19). The number of areas included in one scan (one line) is taken to be eight. The initial clock is assumed to correspond to the amount of 100 clocks of the primary clock CLK. It is assumed that the change rate data S613 is 1 in the first area, 2 in the second area, FF in the third area and 1 in the eighth area that is the final area.

For the first main scanning area, the created image clock VCLK is input to the counter 611 and the number of pixels is counted. When the number of pixels matches the area size data S610 (=19), the comparator 613 outputs a "high" area complete signal S611 of the width of one clock of the image clock VCLK. The fact that the count value for the number of pixels matches the area size data S610 (=19) in this manner indicates that the scanning area has switched from a certain main scanning area to the next main scanning area.

By input of the "high" area complete signal S611 into the OR operator 612, the counter 611 is cleared. In order to determine the next area size, the counter 611 starts a count operation once again. The area complete signal S611 is also connected to the aforementioned select circuit 619. The select circuit 619 outputs a signal S605 (number of primary clock CLKs required to create image clock VCLK) at the time the area complete signal is output, as a signal S617.

Accordingly, the image clock that is applied to the final pixel of the immediately preceding main scanning area is carried over for the initial clock that is applied to the start pixel of each main scanning area. By adding the change rate data of each pixel to the value of the image clock, it is possible to change the image clock period (frequency) for each pixel.

Figure 8:
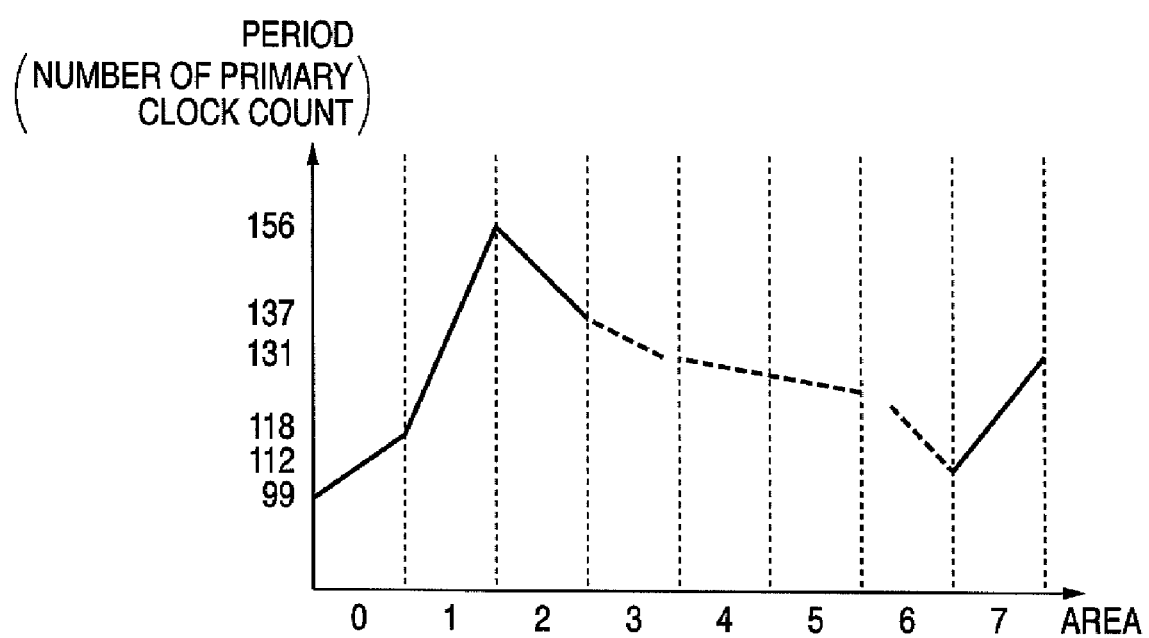
FIG. 8 is a view showing one example of the relation between main scanning areas and a period of an image clock VCLK.

FIG. 8 is a view that illustrates one example of the relation between main scanning areas and periods of the image clock VCLK. It can be understood from this figure that a period of the image clock VCLK is corrected for each pixel. It can be also understood that, within each main scanning area, the image clock period monotonically increases or monotonically decreases.

[Method of Creating Change Rate Data]

Figure 9:
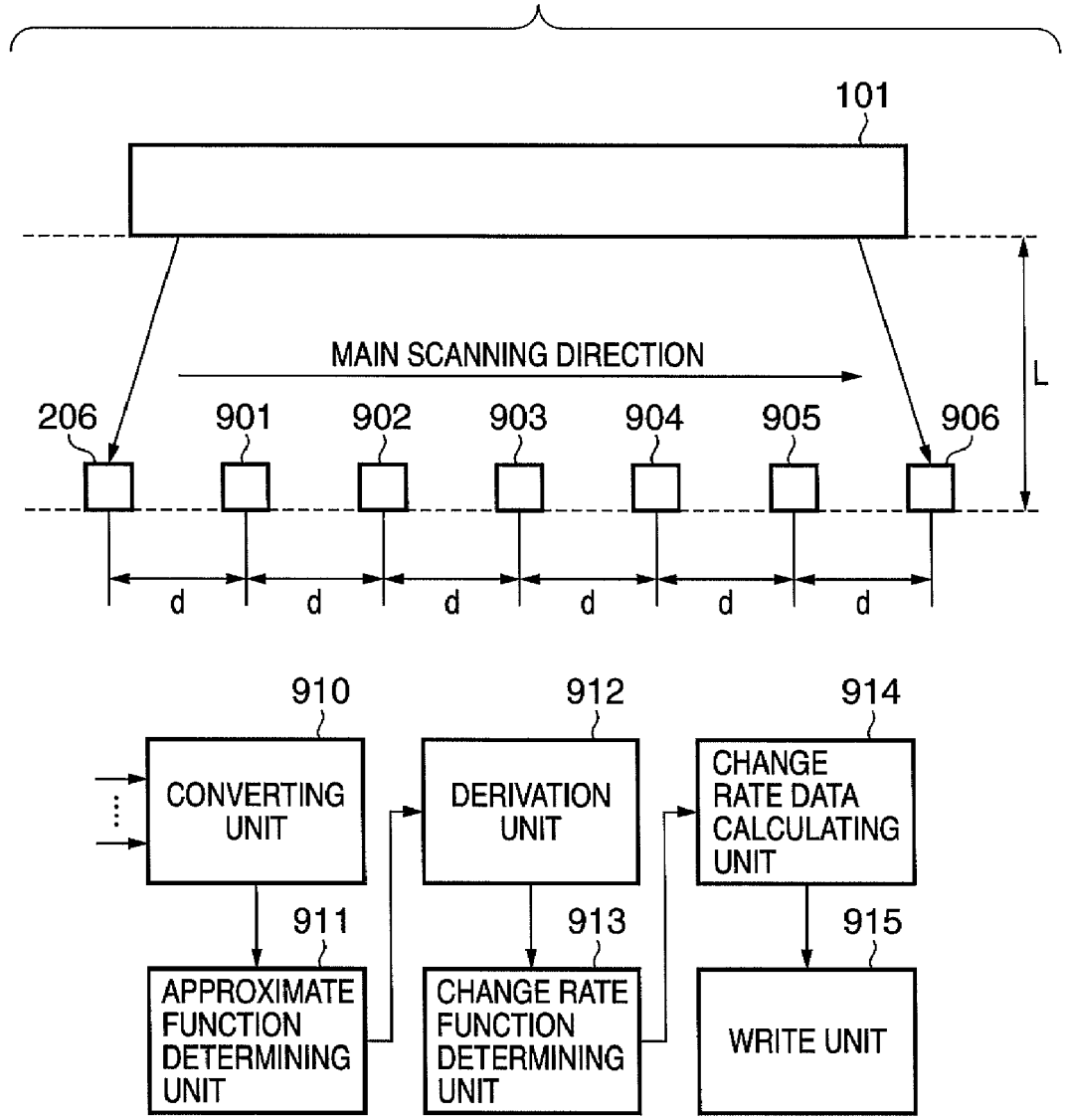
FIG. 9 is a view showing one example of a jig tool for measuring a partial magnification ratio of a scanning optical apparatus.

FIG. 9 is a view showing one example of a jig tool for measuring a partial magnification ratio of a scanning optical apparatus. Each unit may be implemented by a dedicated circuit such as an ASIC or by a CPU, a ROM, a RAM and a computer program. A plurality of sensors are disposed along the scanned plane to receive a light of a beam. In this case, the term "partial magnification ratio" refers to a magnification ratio (actual width of area/ideal width of area) in each area when one line in the main scanning direction is divided into a plurality of areas. The BD sensor 206 for detecting a scanning reference position is disposed at the scan start position. Further, a plurality of scan position detection sensors 901 to 906 are disposed along the main scanning direction at even intervals d. Although the number of scan position detection sensors in this case is seven, this is merely one example.

A distance L between the laser exposure unit 101 and the jig tool is assumed to be equal to a distance from the photosensitive drum 102 when the laser exposure unit 101 is mounted in the image forming apparatus.

The jig tool causes the semiconductor laser 200 to emit light at full lighting to scan a beam along the scanning plane. A converting unit 910 converts a time difference of output of output signals that are output from the sensors into an image height. For example, the converting unit 910 measures a time difference between a detection signal that is output from the BD sensor 206 and a detection signal that is output from each scan position detection sensor, and converts the measured time difference into a distance. This distance corresponds to the aforementioned image height.

An approximate function determining unit 911 determines an approximate function that represents a correlation between an image height acquired by the converting unit and a shift amount with respect to the ideal image height. A derivation unit 912 determines a derivation function that is obtained by performing derivation of an approximate function. The derivation function represents the rate of change of a frequency. A change rate function determining unit 913 determines a change rate function for obtaining change rate data by adding a constant (for example: 1) to the derivation function. The change rate function represents a frequency ratio. A change rate data calculating unit 914 calculates change rate data for each main scanning area based on the change rate function. A write unit 916 writes change rate data for each main scanning area in the storage unit 503 (storage device 615 such as a register).

Figure 10A:
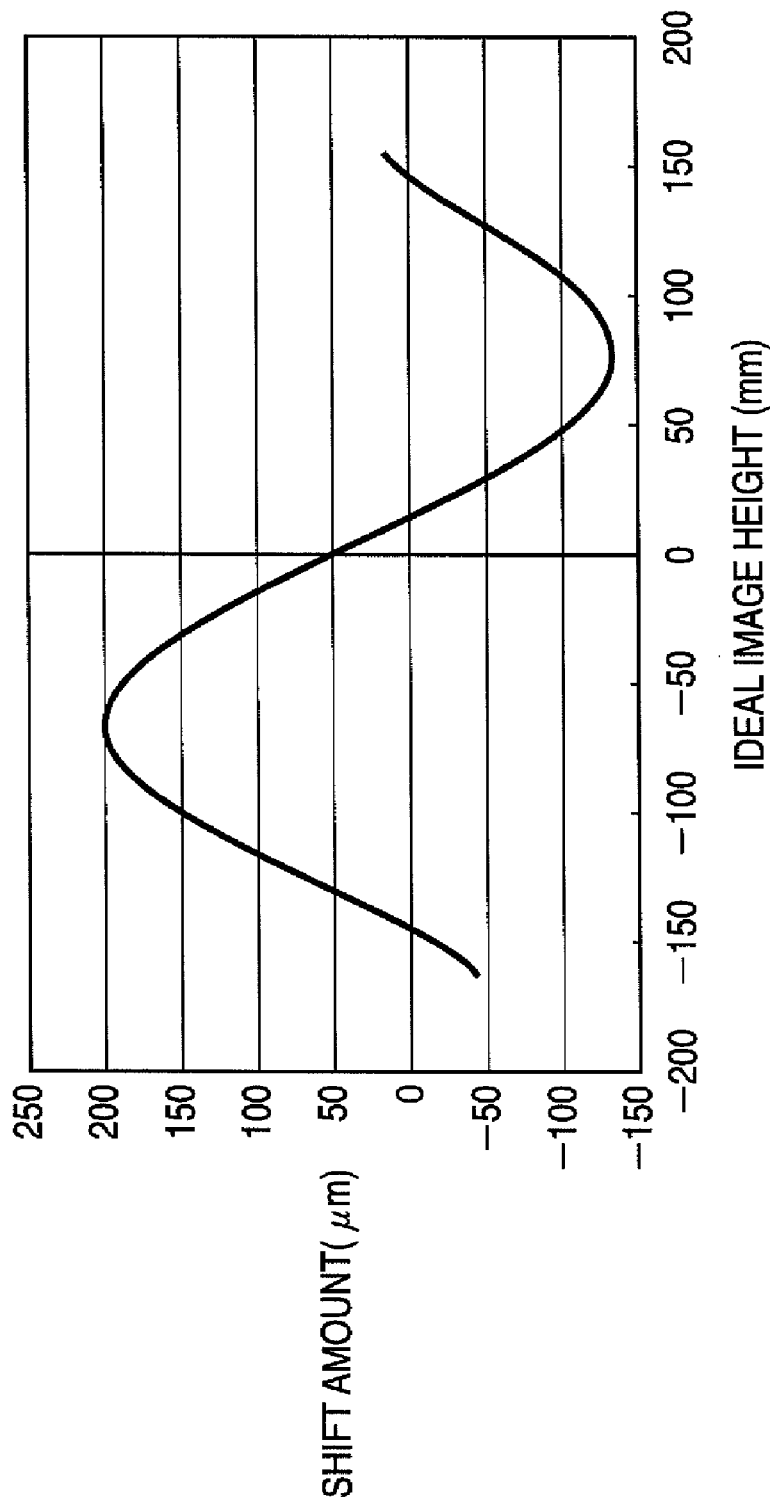
FIG. 10A is a graph that shows an example of approximate functions.

FIG. 10A is a graph that shows an example of approximate functions. The abscissa shows ideal image heights. The ordinate shows shift amounts from the ideal image heights. This function is a quintic approximate function. Hence, a derivation function obtained by derivation is a quartic function. This derivation function represents the rate of change of the frequency. Hence, a function that is obtained by adding one to the derivation function is a function that expresses a frequency ratio.

Figure 10B:
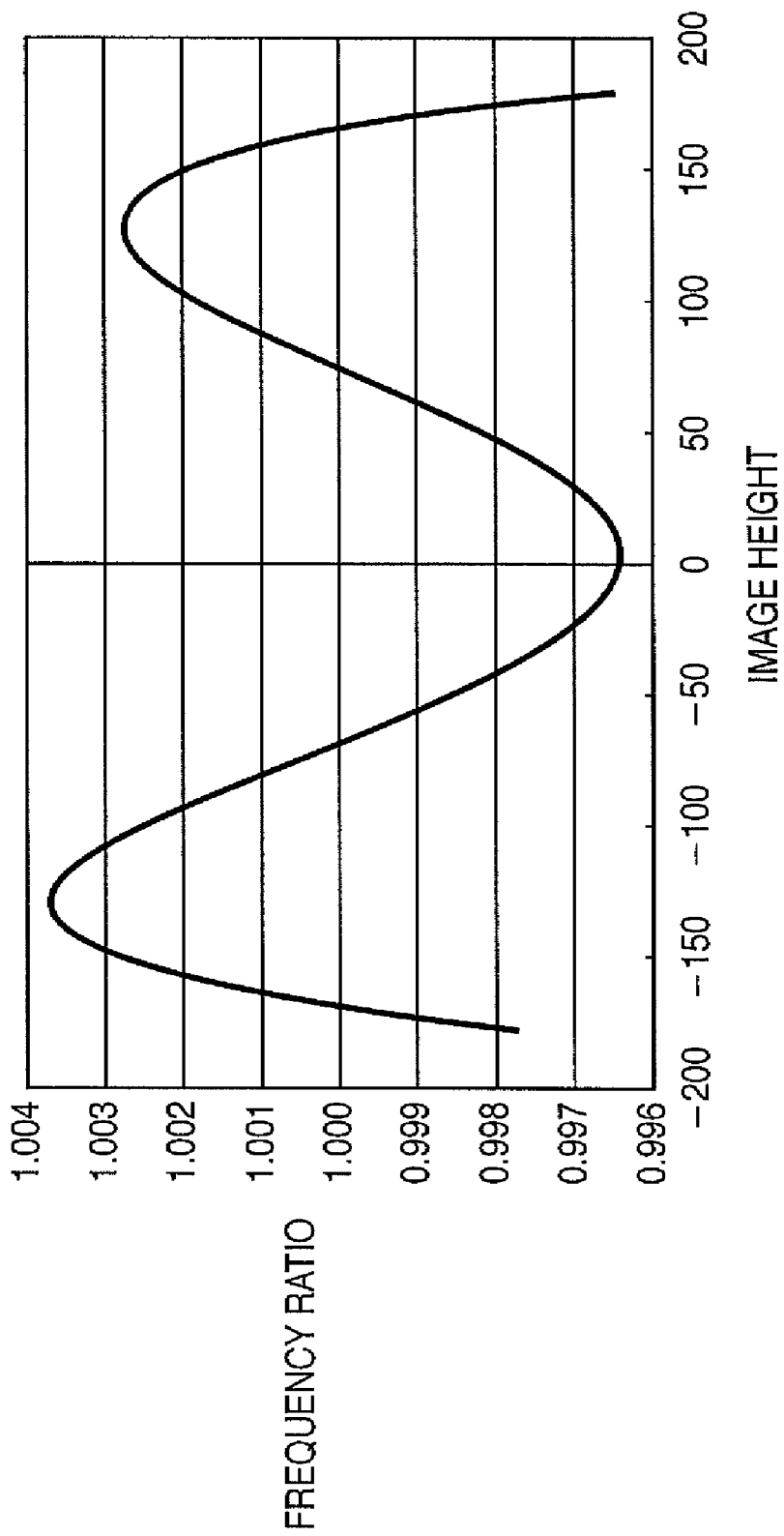
FIG. 10B is a graph that shows an example of frequency ratios.

FIG. 10B is a graph that shows an example of frequency ratios. The abscissa shows ideal image heights. The ordinate shows frequency ratios. FIG. 10C is a graph that shows an example of frequency distribution. The abscissa shows ideal image heights. The ordinate shows frequencies. In this case, a frequency distribution in one scan for which a post-correction target frequency is determined as 60 MHz is illustrated. Each frequency is calculated by multiplying a frequency ratio according to the image height by the target frequency.

For example, it is assumed that one line is divided into 14 main scanning areas from 0 to 13. In this case, based on FIG. 10C, the initial frequency of area 0 is 59.96 MHz (○ point). The initial frequency of area 1 is 60.23 MHz. The initial frequency of area 2 is 60.29 MHz. Finally, the initial frequency of area 13 is 60.02 MHz (each ● point). The dashed line circle is the clock for calculating the end frequency of area 13 which is at 59.66 MHz.

FIG. 11 is a view that shows one example of change rate data that is calculated for each main scanning area. For each main scanning area, a change time for each pixel (derivation coefficient) is calculated based on the initial frequency, and change rate data is calculated based on the calculated change time for each pixel. When calculating the change rate data, naturally the number of pixels in one area and the frequency of the primary clock are taken into consideration.

Figure 12:
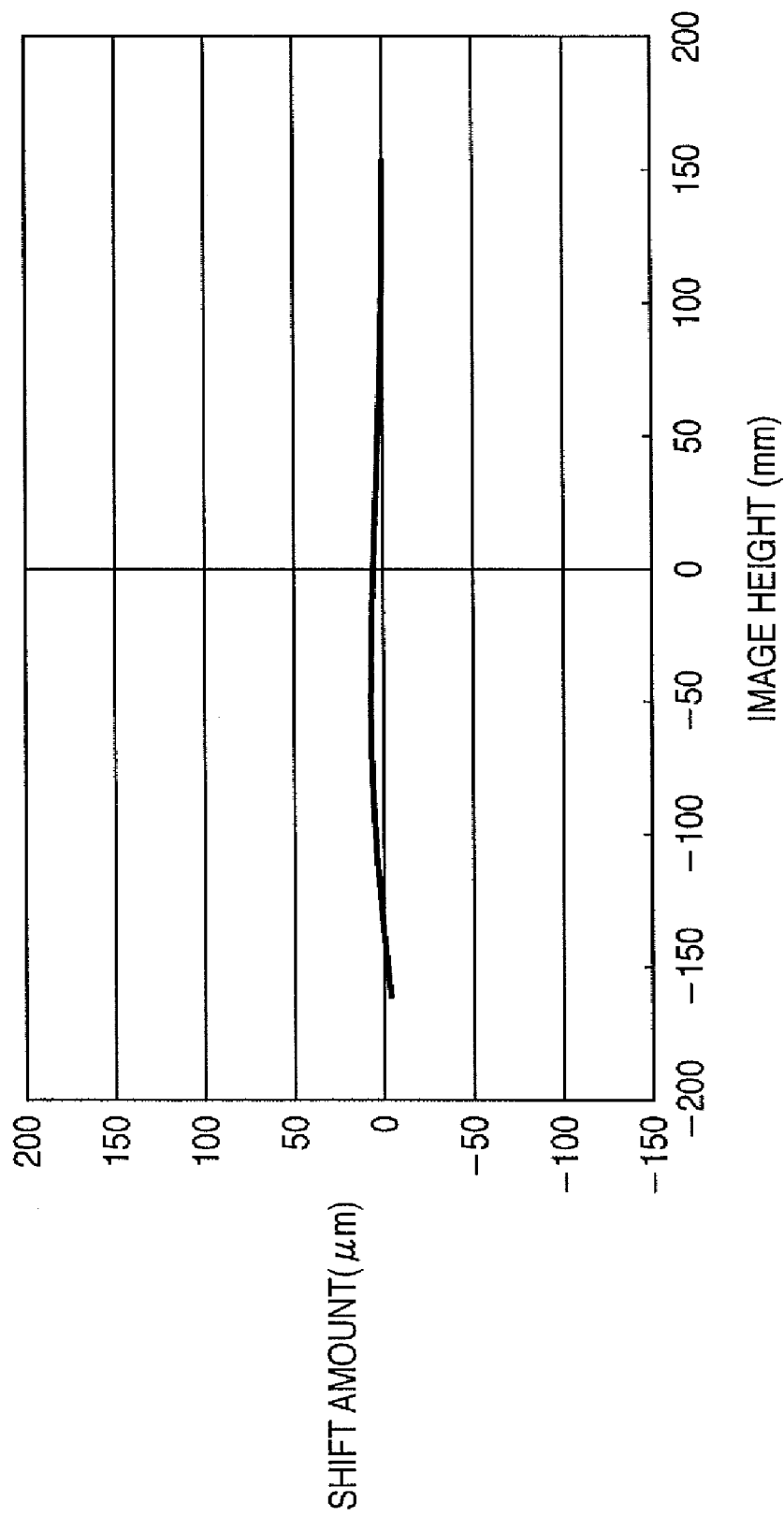
FIG. 12 is a view that shows one example of a shift of a variable magnification ratio after correction.

FIG. 12 is a view that shows one example of a shift of a variable magnification ratio after correction. Although the maximum shift amount is about 200 μm before correcting the image clock, it is found that by applying the invention according to the present embodiment, the maximum shift amount can be decreased to about 7 μm.

According to the present embodiment, since the image clock is corrected for each pixel, the correction accuracy can be improved in comparison to a case of correcting the image clock in area units. In particular, by calculating the amount of correction for each pixel included in the relevant main scanning area on the basis of change rate data that is prepared for each main scanning area, the number of registers can be decreased while maintaining the correction accuracy. For example, by calculating an amount of correction that monotonically increases or monotonically decreases the frequency of the image clock in accordance with the change rate data, a circuit for calculating can be simplified.

Further, by acquiring change rate data using a jig tool, the accuracy of correction can be enhanced. Furthermore, by reading out the change rate data that corresponds to the next main scanning area when a count value from a counter reaches a value that indicates that the scanning area has switched from a certain main scanning area to the next main scanning area, switching of change rate data can be implemented using a comparatively simple circuit. Further, by determining the initial frequency of an image clock to be applied to a start pixel of each main scanning area on the basis of a total magnification ratio of one line in the main scanning direction and, for each subsequent area, carrying over the frequency applied to the final pixel of the immediately preceding main scanning area, a holding unit for initial frequencies can be easily configured. Furthermore, by employing the scanning optical apparatus according to the present embodiment as the laser exposure unit 101 in an image forming apparatus, images can be formed with few shifts of variable magnification ratio and few color misalignments.

Second Embodiment

According to the first embodiment, change rate data is acquired using a jig tool and written in a memory such as an EEPROM of a scanning optical apparatus. However, a configuration may also be adopted in which an image forming apparatus on which the scanning optical apparatus is mounted acquires the change rate data without using a jig tool.

Figure 13:
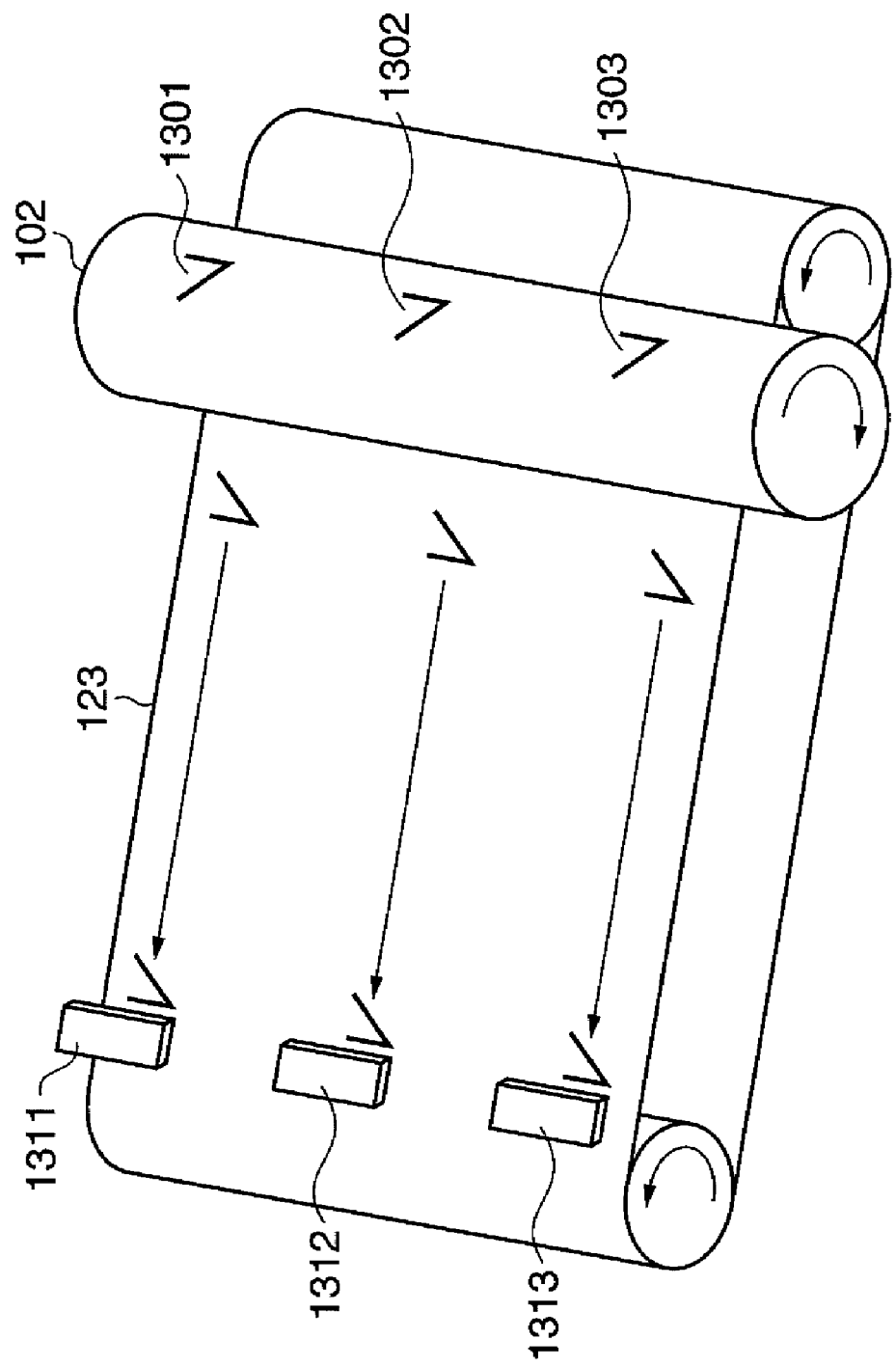
FIG. 13 is a view that illustrates one portion of an image forming unit according to the embodiments.

FIG. 13 is a view that illustrates one portion of an image forming unit according to the present embodiment. In this case, only one photosensitive drum 102 is illustrated to simplify the description. Patterns 1301, 1302, and 1303 are formed at regular intervals in the main scanning direction on the photosensitive drum 102. These patterns are transferred onto a transfer belt 123. Each transferred pattern is moved from the right to the left of FIG. 13 by driving of the transfer belt 123. Each pattern is then read by corresponding reflection-type reading sensors 1311, 1312, and 1313. In this case, the three reading sensors are disposed in correspondence with the two edges and the center part in the main scanning direction. The intervals between the reading sensors are equal to each other. In this connection, the reason the number of reading sensors is taken as three is that, for a single magnification component among a partial magnification ratio, detection can be performed if there is at least three reading sensors. Naturally, a larger number of reading sensors may also be disposed.

Figure 14:
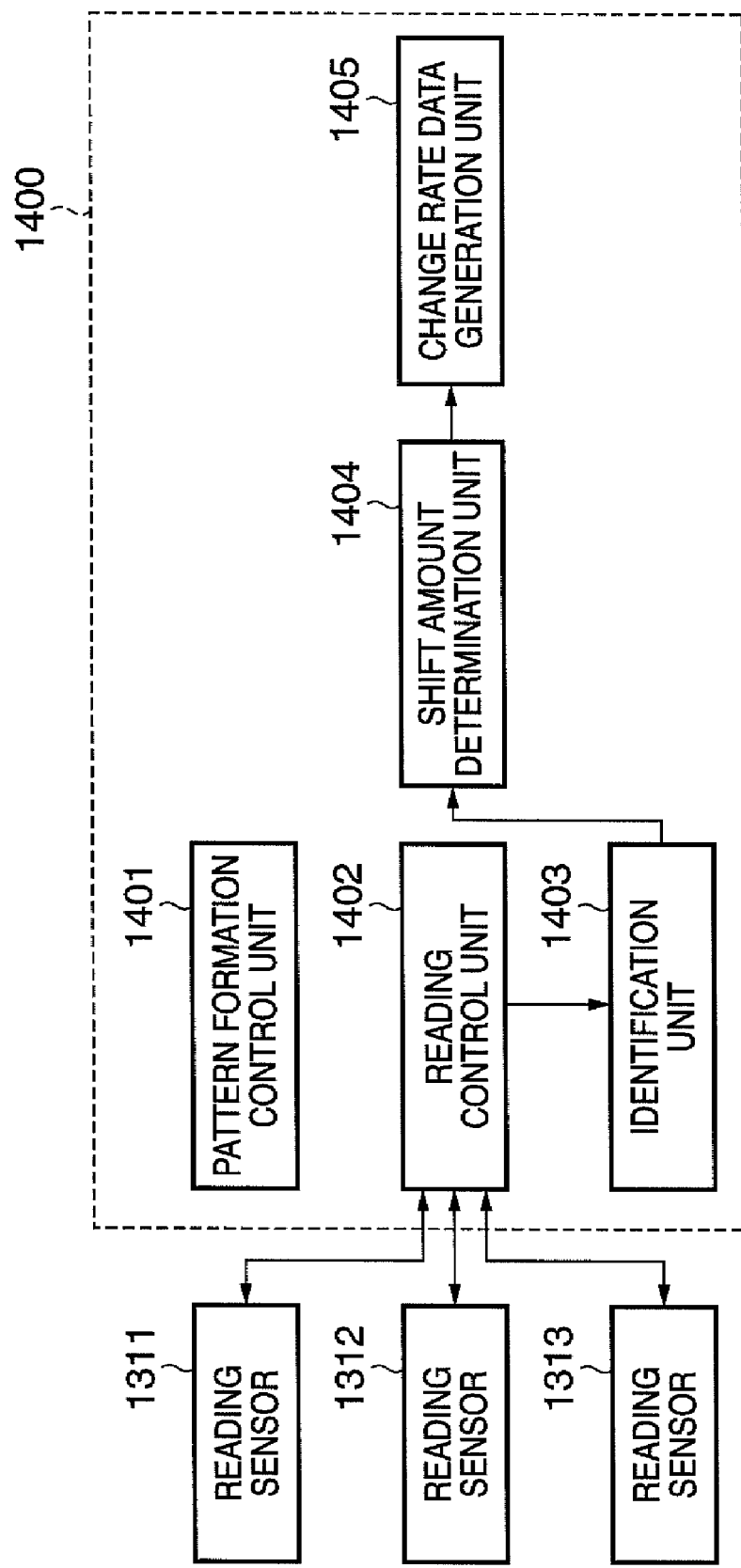
FIG. 14 is a view that illustrates one example of a control unit of an image forming apparatus according to the embodiments.

FIG. 14 is a view that illustrates one example of a control unit 1400 of an image forming apparatus according to the present embodiment. Each unit may be implemented by a dedicated circuit such as an ASIC or may be implemented by a CPU, a ROM, a RAM and a computer program. In this case, only units that relate to acquisition of change rate data are shown. A pattern formation control unit 1401 is a unit for controlling pattern formation processing, such as sending to the image signal creating unit 209 image data for forming a pattern along the main scanning direction on a transfer member included in a transfer unit or an image carrier. A reading control unit 1402 is a unit that controls the reading sensors 1311 to 1313 in order to read a plurality of patterns that are formed, and outputs detection signals in accordance with the patterns that are read. An identification unit 1403 is a unit that identifies a formation position of each pattern from the detection signals. A shift amount determination unit 1404 is a unit that, for each pattern, determines a shift amount with respect to an ideal formation position of the formation positions that are identified by the identification unit 1403. A change rate data generation unit 1405 is a unit that generates change rate data for each main scanning area from the shift amounts that are determined and writes the change rate data in the storage unit 503.

Figure 15:
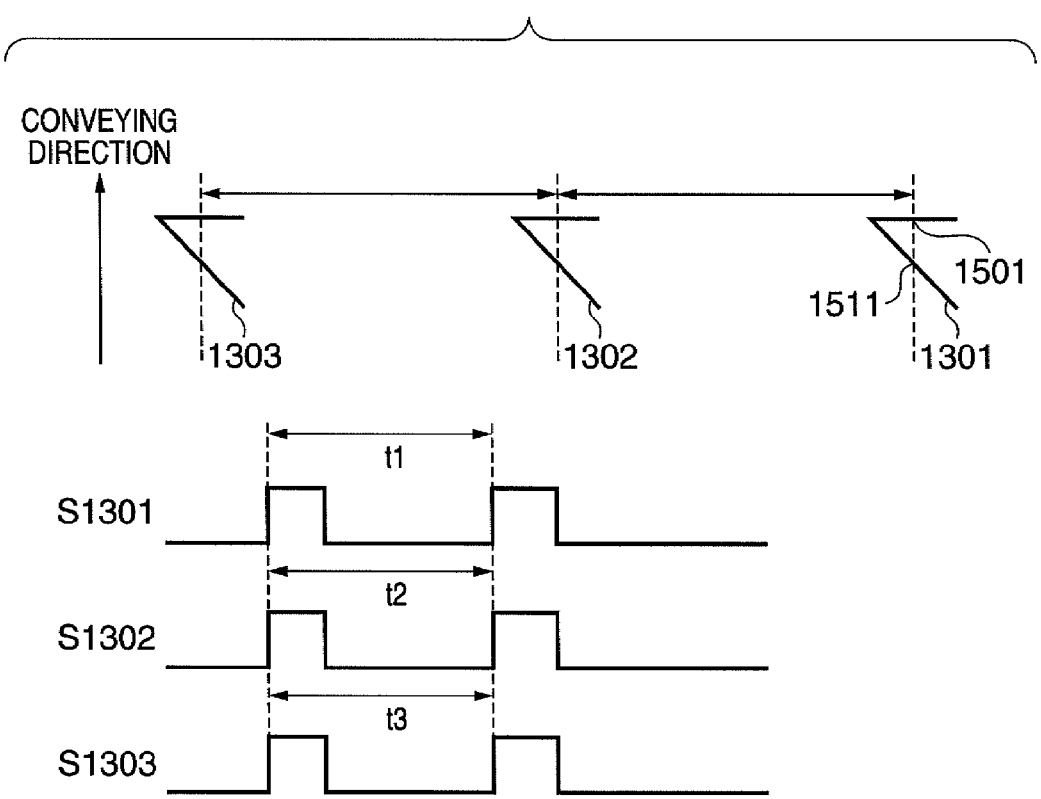
FIG. 15 is a view for describing a concept of processing to identify a pattern formation position.

FIG. 15 is a view for describing a concept of processing to identify a pattern formation position. When a point 1501 that is one part of the pattern 1301 passes the reading sensor 1311, an initial pulse is output. Next, when a point 1511 that is one part of the pattern 1301 passes the reading sensor 1311, a second pulse is output. These pulses are included in the detection signal S1301. Detection signals S1302 and S1303 are output according to the same principle for the other patterns 1302 and 1303. When the patterns 1301 to 1303 are disposed at equal distances from each other on the transfer belt 123 (when there is no shift of variable magnification ratio), the pulse intervals t1, t2, and t3 of the detection signals S1302, S1302, and S1303 that are output from the respective reading sensors are equal. The identification unit 1403 acquires the pulse intervals t1, t2, and t3 from the detection signals. Naturally, the pulse intervals t1, t2, and t3 correspond to the formation positions of each pattern.

Figure 16:
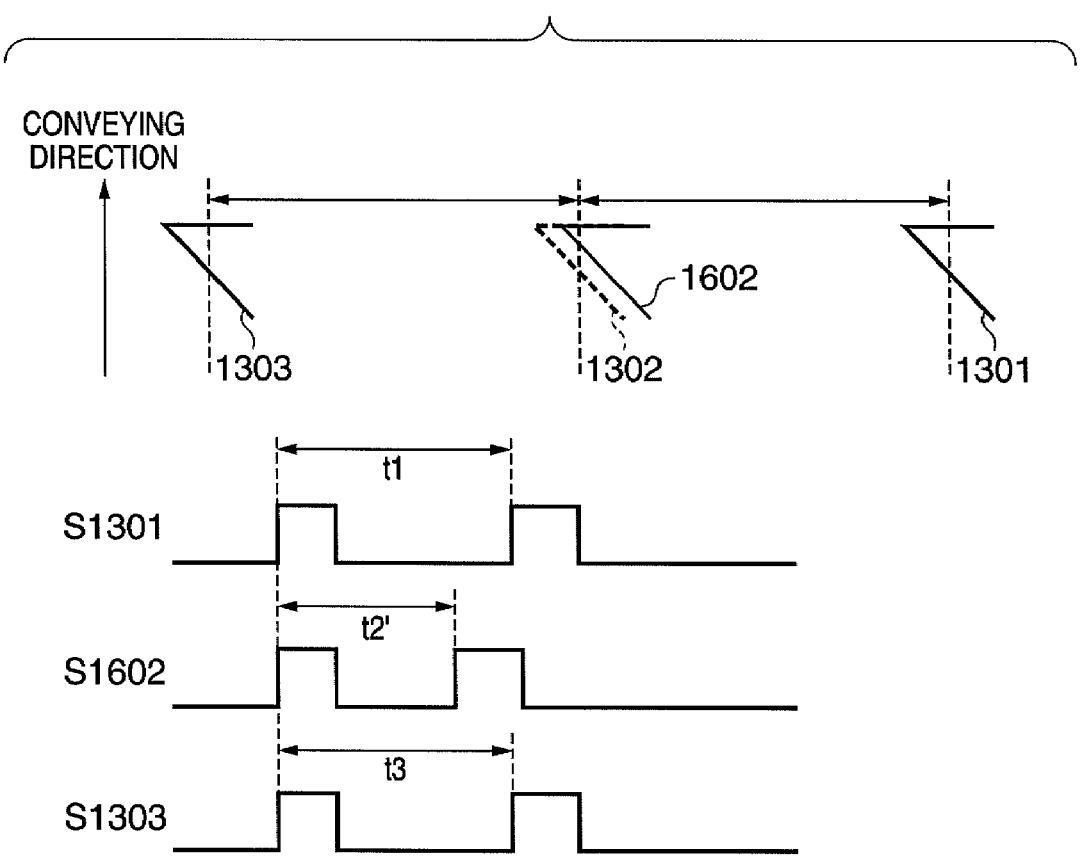
FIG. 16 is a view for describing a concept of processing to identify a pattern formation position.

FIG. 16 is a view for describing a concept of processing to identify a pattern formation position. In this case, an example of detection signals and pattern formation positions when a shift of variable magnification ratio occurs is illustrated. According to FIG. 16, a pattern 1602 that is formed in the center is formed at a position that is shifted from the original position due to a shift of a single magnification component. Therefore, a pulse interval t2' in a detection signal S1602 corresponding to the pattern 1602 is shorter than t1 or t3.

Figure 17:
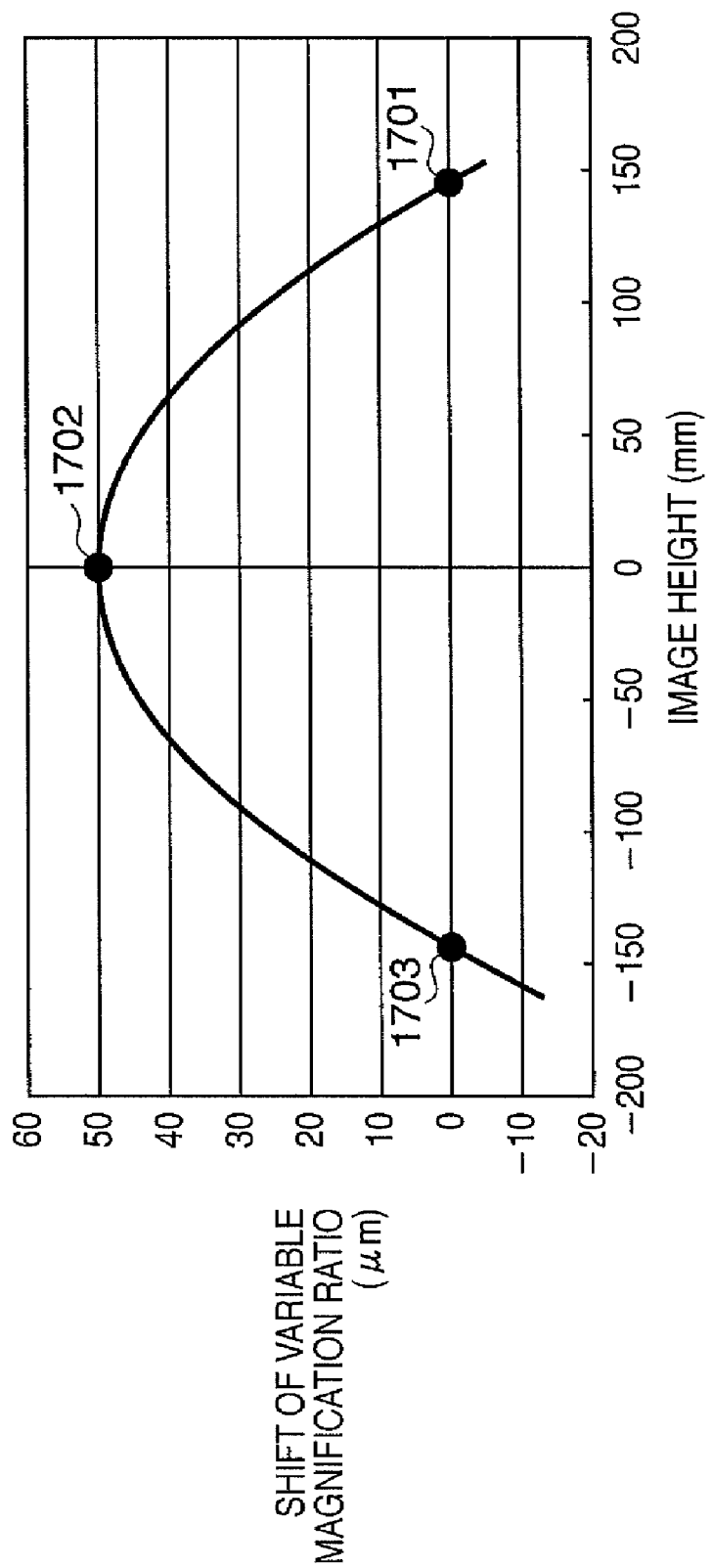
FIG. 17 is a graph that shows the relation between an ideal image height and a shift amount.

FIG. 17 is a graph that shows the relation between an ideal image height and a shift amount. This graph is one that illustrates the situation when the shift of a single magnification component shown in FIG. 16 occurs. The abscissa shows ideal image heights, and the ordinate shows shift amounts with respect to the ideal image heights. A dot 1701 corresponds to t1 that is obtained for the pattern 1301. A dot 1702 corresponds to t2' that is obtained for the pattern 1602. A dot 1703 corresponds to t3 that is obtained for the pattern 1303. The shift amount determination unit 1404 converts a pulse interval into an image height and calculates a shift amount with respect to an ideal image height for the acquired actual image height.

As described above, a single magnification component is a quadratic function. Hence, the change rate data generation unit 1405 determines the quadratic function by approximation from the coordinates of three dots. As described in the first embodiment, a linear function that is obtained by derivation of this quadratic function is a function that represents the rate of change of the frequency. The change rate data generation unit 1405 determines a linear function by derivation of a quadratic function, and further adds 1 as a constant to generate a function that expresses a frequency ratio. This function is a function for correcting the single magnification component.

By multiplying this frequency ratio by the target frequency, the change rate data generation unit 1405 calculates change rate data for each area. The change rate data generation unit 1405 then writes the change rate data for each area in the storage unit 503.

According to the present embodiment, there is the advantage that change rate data can be generated without using a jig tool. Further, since changes with time and the like that occur after factory shipment are also reflected in this change rate data, it can be expected that the correction accuracy will be further enhanced.

Third Embodiment

The first embodiment relates to a method of determining change rate data using a jig tool, and the second embodiment relates to a method of determining change rate data in an image forming apparatus. The third embodiment relates to a method of correcting an image clock by determining new change rate data on the basis of change rate data that is determined using a jig tool and a partial magnification ratio that is measured in an image forming apparatus. More specifically, the third embodiment combines the first embodiment and the second embodiment.

Figure 18:
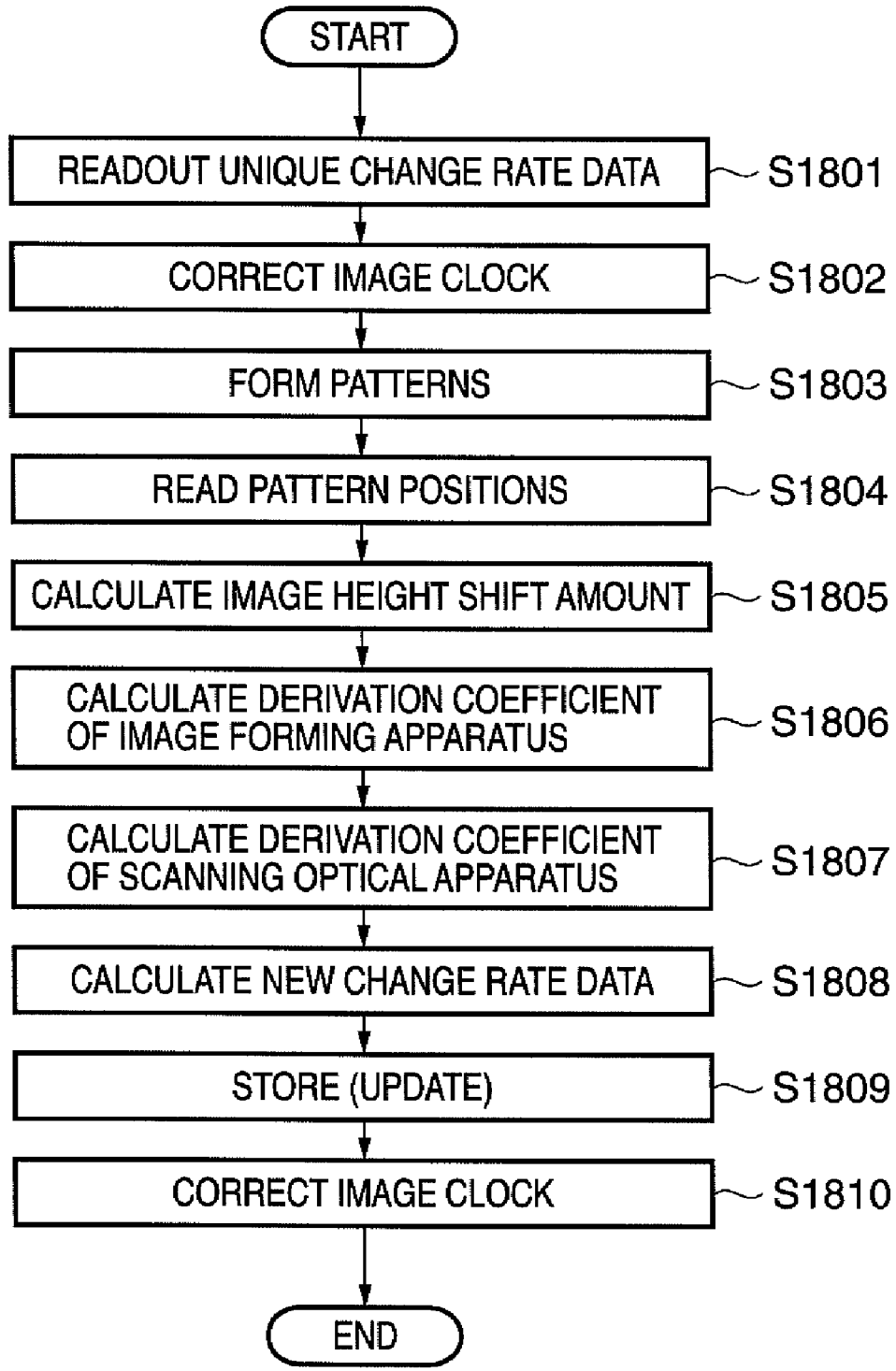
FIG. 18 is an exemplary flowchart that illustrates an image clock correction method according to the embodiments.

FIG. 18 is an exemplary flowchart that illustrates an image clock correction method according to the present embodiment. In step S1801, the correction amount calculating unit 504 reads out unique change rate data of the scanning optical apparatus from the storage unit 503. In step S1802, the correction amount calculating unit 504 determines an amount of correction based on the data that is read out, and the correction unit 502 corrects the image clock in accordance with the amount of correction.

In step S1803, the pattern formation control unit 1401 forms patterns. In step S1804, the reading control unit 1402 reads the patterns and identifies the formation position of each pattern. In step S1805, the shift amount determination unit 1404 calculates an image height shift amount. In step S1806, the change rate data generation unit 1405 calculates a derivation coefficient. As described above, the change rate data generation unit 1405 determines a quadratic function from an image height shift amount, and calculates a linear function by derivation of the quadratic function.

FIG. 19 is a view that shows a calculation example of derivation coefficients that are calculated based on a partial magnification ratio. These derivation coefficients are calculated by substituting the value of the image height corresponding to the respective area into the linear function that is calculated. Naturally, the derivation coefficients correspond to the change times for each pixel that were described using FIG. 11.

At step S1807, the change rate data generation unit 1405 also calculates derivation coefficients by a reverse operation from default change rate data that is read out from the storage unit 503. In this connection, the position of step S1807 may be any position as long as it is after step S1801.

FIG. 20 is a view that shows a calculation example of derivation coefficients that are calculated based on change rate data with respect to a default. In this case, an approximate function that represents unique image height shift amounts of the laser exposure unit 101 is taken as f(x). Further, an approximate function that represents image height shift amounts detected based on patterns formed according to an image clock that is corrected using default change rate data is taken as g(x). An approximate function h(x) that represents an image height shift amount (partial magnification ratio) for the image forming apparatus overall is:

$$h(x)=f(x)+g(x).$$

As described above, a derivation function obtained by derivation of an approximate function is a function that represents the rate of change of a frequency. Further, a function obtained by adding 1 as a constant to this derivation function is a correction function (=1+h'(x)) for correcting an image clock. In this connection, 1+h'(x)=1+f'(x)+g'(x).

At step S1808, the change rate data generation unit determines a frequency ratio based on the correction function, and multiples the frequency ratio by the target frequency. The change rate data generation unit also calculates an initial clock or an image clock for the start pixel of each area. Finally, the change rate data generation unit calculates the change rate data. At step S1809, the change rate data generation unit updates the change rate data by writing the new change rate data into the storage unit 503. Thus, the change rate data generation unit also functions as an updating unit that updates the change rate data that is stored in the storage unit.

In this connection, when the default change rate data is stored in a non-volatile memory such as an EEPROM, the new change rate data is stored in a RAM. The new change rate data that is stored in the RAM is then used to correct the image clock. Naturally, the new change rate data may be used as the default change rate data thereafter. At step S1810, the correction amount calculating unit 504 and the correction unit 502 determine an amount of correction for each pixel using the new change rate data and correct the image clock.

According to the present embodiment, since change rate data that is set using a jig tool can be updated in an image forming apparatus, change rate data can be optimized in accordance with the installation environment and usage state of individual image forming apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-344670, filed on Dec. 21, 2006, which is hereby incorporated by reference herein in its entirety.

What is claimed is:

1. A scanning optical apparatus that scans a scanning plane with a beam by rotating and deflecting the beam emitted from a light source, comprising:
   a determination unit which determines, for each pixel, an amount of correction of an image clock for controlling an output timing of the beam, wherein each pixel forming one line along a main scanning direction of the beam;
   a correction unit which corrects an image clock for each pixel in accordance with the determined amount of correction by the determination unit;
   a creating unit which creates an image signal in accordance with the corrected image clock that has been corrected by the correction unit; and
   a drive control unit that controls driving of the light source in accordance with the image signal created by the creating unit;
   said determination unit including:
   a storage unit which, for each main scanning area that is formed by dividing one line along the main scanning direction into a plurality of areas, stores change rate data representing a rate of change of the amount of correction to be applied to pixels included in the relevant main scanning area; and
   a correction amount calculating unit which, for each main scanning area, reads out the corresponding change rate data from said storage unit, and calculates an amount of correction for each pixel in accordance with the read out change rate data.

2. The scanning optical apparatus according to claim 1, wherein said correction amount calculating unit calculates the amount of correction for each main scanning area forming one line along the main scanning direction, so as to monotonically increase or monotonically decrease a frequency of the image clock in accordance with the respectively corresponding change rate data.

3. The scanning optical apparatus according to claim 1, wherein the change rate data for each main scanning area that is stored in said storage unit is obtained by a jig tool including: a plurality of sensors disposed along the scanning plane for receiving a light of the beam; a converting unit which converts output time differences of output signals that are output from said sensors into image heights; an approximate function determining unit which determines an approximate function that represents a correlation between an image height that is obtained by said converting unit and a shift amount with respect to an ideal value of the image height; a derivation unit which determines a derivation function that is obtained by derivation of the determined approximate function; a change rate function determining unit which determines a change rate function for obtaining the change rate data by adding a constant to the derivation function; a change rate data calculating unit which calculates the change rate data based on the change rate function; and a write unit which writes the change rate data in said storage unit for each main scanning area.

4. The scanning optical apparatus according to claim 1, further comprising:
   a detection unit which detects a start timing of a main scanning by receiving a light of the beam; and
   a counter which starts a count when the start timing of the main scanning is detected;

wherein, when a count value of said counter reaches a value indicating that scanning is switched from a certain main scanning area to a next main scanning area, said correction amount calculating unit reads out the change rate data corresponding to the next area.

5. An image forming apparatus, comprising:
a scanning optical apparatus according to claim 1;
an image carrier which is scanned with a beam by said scanning optical apparatus;
a developing unit which develops a latent image that is formed on said image carrier into a developer image; and
a transfer unit which transfers said developer image onto a recording medium.

6. The image forming apparatus according to claim 5, further comprising:
an identification unit which reads a plurality of patterns that are formed along a main scanning direction on a transfer member included in said image carrier or said transfer unit to identify a formation position of each pattern;
a shift amount determination unit which determines a shift amount with respect to an ideal formation position for each pattern, of a formation position that is identified by said identification unit; and
a generation unit which generates change rate data for each of the main scanning areas based on the shift amount that is determined.

7. The image forming apparatus according to claim 6, further comprising at least three reading sensors that are disposed in correspondence with two edges and a center portion in a main scanning direction in order to read the plurality of patterns, respectively.

8. An image forming apparatus, comprising:
a scanning optical apparatus according to claim 1;
an image carrier which is scanned with a beam by said scanning optical apparatus;
a developing unit which develops a latent image that is formed on said image carrier into a developer image;
a transfer unit which transfers said developer image onto a recording medium;
an identification unit which reads a plurality of patterns that are formed along a main scanning direction on a transfer member included in said image carrier or said transfer unit to identify a formation position of each pattern;
a shift amount determination unit which, for each pattern, determines a shift amount with respect to an ideal formation position, of a formation position that is identified by said identification unit;
a generation unit which generates change rate data for each of the main scanning areas based on the shift amount that is determined; and
an updating unit which updates change rate data that is stored in said storage unit by writing in said storage unit change rate data that is generated by said generation unit when the patterns are formed by applying change rate data that is stored in said storage unit.

9. A scanning optical apparatus that scans a scanning plane with a beam by rotating and deflecting the beam emitted from a light source, comprising:

a determination unit which determines, for each pixel, an amount of correction of an image clock for controlling an output timing of the beam, wherein each pixel forming one line along a main scanning direction of the beam;
a correction unit which corrects an image clock for each pixel in accordance with the determined amount of correction by the determination unit;
a creating unit which creates an image signal in accordance with the corrected image clock that has been corrected by the correction unit;
a drive control unit that controls driving of the light source in accordance with the image signal created by the creating unit; and
a setting unit which sets an initial frequency of an image clock to be applied to a start pixel in each of a plurality of main scanning areas,
said setting unit including:
an initial frequency determination unit which determines an initial frequency of an image clock to be applied to a start pixel of a first main scanning area among the plurality of main scanning areas based on a total magnification ratio of one line in the main scanning direction; and
a carry-over unit which carries over a frequency that is applied to a final pixel in an immediately preceding main scanning area as an initial frequency to be applied to respective start pixels in a second main scanning area to a final main scanning area among the plurality of main scanning areas.

10. An image clock correction method that is applied to a scanning optical apparatus that scans a scanning plane with a beam by rotating and deflecting the beam emitted from a light source, comprising:
a determination step which determines, for each pixel, an amount of correction of an image clock for controlling an output timing of the beam, wherein each pixel forming one line along a main scanning direction of the beam;
a correction step which corrects an image clock for each pixel in accordance with the determined amount of correction determined by the determination step;
a creation step which creates an image signal in accordance with the corrected image clock that has been corrected by the correction step; and
a drive control step that controls driving of the light source in accordance with the image signal created by the creation step;
said determination step including:
a storage step which, for each main scanning area that is formed by dividing one line along the main scanning direction into a plurality of areas, stores change rate data representing a rate of change of the amount of correction to be applied to pixels included in the relevant main scanning area; and
a correction amount calculation step which, for each main scanning area, reads out the corresponding change rate data from said storage step, and calculates an amount of correction for each pixel in accordance with the read out change rate data.

* * * * *